US012598497B2

(12) United States Patent　　　(10) Patent No.:　US 12,598,497 B2
Ramachandra et al.　　　　　　　　(45) Date of Patent:　Apr. 7, 2026

(54) RADIO NETWORK NODE, USER EQUIPMENT AND METHODS PERFORMED THEREIN

(71) Applicant: Telefonaktiebolaget LM Ericsson (publ), Stockholm (SE)

(72) Inventors: Pradeepa Ramachandra, Linköping (SE); Sakib Bin Redhwan, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 333 days.

(21) Appl. No.: 18/039,131

(22) PCT Filed: Dec. 15, 2021

(86) PCT No.: PCT/SE2021/051259
　　§ 371 (c)(1),
　　(2) Date: May 26, 2023

(87) PCT Pub. No.: WO2022/132011
　　PCT Pub. Date: Jun. 23, 2022

(65) Prior Publication Data

US 2023/0422068 A1　　Dec. 28, 2023

Related U.S. Application Data

(60) Provisional application No. 63/126,608, filed on Dec. 17, 2020.

(51) Int. Cl.
　　*H04W 24/10*　　(2009.01)
　　*H04W 24/08*　　(2009.01)
　　*H04W 84/04*　　(2009.01)
(52) U.S. Cl.
　　CPC ........... *H04W 24/10* (2013.01); *H04W 24/08* (2013.01); *H04W 84/042* (2013.01)

(58) Field of Classification Search
　　CPC ..... H04W 24/10; H04W 24/08; H04W 24/02; H04W 84/042
　　See application file for complete search history.

(56) References Cited

U.S. PATENT DOCUMENTS 8,891,396 B2 * 11/2014 Schmidt ................ H04W 24/10
　　　　　　　　　　　　　　　　　　455/67.11
10,225,756 B2 * 3/2019 Reider .................. H04W 24/10
　　(Continued)

FOREIGN PATENT DOCUMENTS

CA　　　2789499 A1 * 8/2011 ........... H04W 24/10
EP　　　4233488 B1 * 8/2025 ........... H04W 48/18
　　(Continued)

OTHER PUBLICATIONS

Ericsson, "On open issues of RA report, MHI and logged MDT", 3GPP TSG-RAN WG2 Meeting #113-e, Electronic Meeting, Jan. 25-Feb. 5, 2021, pp. 1-20, R2-2101419, 3GPP.
　　(Continued)

*Primary Examiner* — Mong-Thuy T Tran
(74) *Attorney, Agent, or Firm* — COATS & BENNETT PLLC

(57) ABSTRACT

Embodiments herein relate to a method performed by a UE (10) for handling one or more measurements in a wireless communications network. The UE (10) logs, when one or more conditions are fulfilled, a measurement associated to a last serving cell after entering an any cell-selection state, wherein the one or more conditions comprise, the last serving cell belongs to a PLMN, said PLMN is configured in the UE (10) in a list of PLMN identities in a logged MDT configuration.

14 Claims, 10 Drawing Sheets

(56) References Cited

U.S. PATENT DOCUMENTS

| | | | | |
|---|---|---|---|---|
| 12,137,357 B2 * | 11/2024 | Fang | ................. | H04W 36/0079 |
| 12,156,064 B2 * | 11/2024 | Fang | .................... | H04W 24/10 |
| 12,342,206 B2 * | 6/2025 | Wang | .................... | H04W 24/02 |
| 2015/0056925 A1 * | 2/2015 | Jung | .................... | H04W 24/10 |
| | | | | 455/67.11 |
| 2017/0105136 A1 | 4/2017 | Reider et al. | | |
| 2019/0306740 A1 | 10/2019 | Kim et al. | | |
| 2022/0286890 A1 * | 9/2022 | Kim | .................... | H04W 24/08 |
| 2023/0117513 A1 * | 4/2023 | Kim | .................... | H04W 76/27 |
| | | | | 455/423 |

FOREIGN PATENT DOCUMENTS

| | | | | |
|---|---|---|---|---|
| WO | 2014157074 A1 | 10/2014 | | |
| WO | WO-2022027167 A1 * | 2/2022 | ............ | H04W 48/04 |

OTHER PUBLICATIONS

Catt, "Detection and Reporting of Out-of-coverage", 3GPP TSG-RAN WG2 Meeting #107, Prague, Czech Republic, Aug. 26-30, 2019, pp. 1-11, R2-1908759, 3GPP.

Huawei et al., "Minor issues on MDT", 3GPP TSG-RAN WG2 Meeting #109bis-e, Electronic, Apr. 20-30, 2020, pp. 1-4, R2-2003574, 3GPP.

3rd Generation Partnership Project, "3rd Generation Partnership Project; Technical Specification Group Radio Access Network; NR; User Equipment (UE) procedures in Idle mode and RRC Inactive state (Release 16)", Technical Specification, 3GPP TS 38.304 V16.2.0, Sep. 2020, pp. 1-39, 3GPP.

3rd Generation Partnership Project, "3rd Generation Partnership Project; Technical Specification Group Radio Access Network; NR; Requirements for support of radio resource management (Release 16)", Technical Specification, 3GPP TS 38.133 V16.5.0, Sep. 2020, pp. 1-1608, 3GPP.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 15)", Technical Specification, 3GPP TS 36.304 V15.7.0, Sep. 2020, pp. 1-55, 3GPP.

3rd Generation Partnership Project, "3rd Generation Partnership Project; Technical Specification Group Radio Access Network; NR; Radio Resource Control (RRC) protocol specification (Release 15)", Technical Specification, 3GPP TS 38.331 V15.6.0, Jun. 2019, pp. 1-519, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Technical Specification, 3GPP TS 36.300 V15.11.0, Sep. 2020, pp. 1-365, 3GPP.

3rd Generation Partnership Project, "3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", Technical Specification, 3GPP TS 37.320 V16.2.0, Sep. 2020, pp. 1-34, 3GPP.

* cited by examiner

START

501. Get configured with logged LDT configuration

502. Perform measurement(s) and enter any cell-selection state

503. Log, when one or more conditions are fulfilled, measurement

504. Transmit logged measurement

END

RADIO NETWORK NODE, USER EQUIPMENT AND METHODS PERFORMED THEREIN

TECHNICAL FIELD

Embodiments herein relate to a radio network node, a user equipment (UE) and methods performed therein regarding wireless communication. Furthermore, a computer program and a computer readable storage medium are also provided herein. In particular, embodiments herein relate to handling communication, such as handling or controlling logging of measurements, in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate e.g. enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

MDT stands for Minimization of Drive Test. 'Drive Test' is a kind of testing in which UEs, around a certain route, measure various network performance, e.g., Cell Power, Interference, or UE performance, such as Call Drop, Throughput, Handover performance, Cell Reselection Performance etc. Usually during an MDT period, a lot of protocol logs are collected from a UE and analyzed by network or are sent to developers when they have serious problems. Regarding MDT also see, R2-2003574, Minor issues on MDT, Huawei, HiSilicon, 3GPP TSG-RAN WG2 Meeting #109bis_e, $20^{th}$ Apr.-$30^{th}$ Apr. 2020.

Logged measurement reporting.

In LTE and in NR, a UE may be configured to perform logged measurement reporting. The UE may perform the logging of measurements periodically and in NR, additionally, one can configure the event driven logged measurement reporting wherein one can configure either an L1 event or an outOfCoverage event. The UE behavior related to the logged measurement logging is captured in section 5.5a of TS 38.331 v.15.6.0. The stage-2 description associated to the same is captured in section 5.1.1 of TS 37.320 v.15.6.0.

In NR, when the UE is performing the logged measurements, the UE logs measurements as long as the UE is either camping normally in a region as specified by the logged measurement configuration (AreaConfiguration) or the UE is in an any cell-selection state, see the excerpts from TS 38.331 v.15.6.0 below.

********************

While T330 is running, the UE shall:
1> perform the logging in accordance with the following:
  2> if the reportType is set to periodical in the VarLogMeasConfig:
    3> if the UE is camping normally on an NR cell and if the registered PLMN (RPLMN) is included in plmn-IdentityList stored in VarLogMeasReport and, if the cell is part of the area indicated by areaConfiguration if configured in VarLogMeasConfig:
      4> perform the logging at regular time intervals, as defined by the logging Interval in the VarLogMeasConfig;
  2> else if the reportType is set to eventTriggered, and eventType is set to outOfCoverage:
    3> perform the logging at regular time intervals as defined by the loggingInterval in VarLogMeasConfig only when the UE is in any cell-selection state;

-continued

> 3> perform the logging immediately upon transitioning from the any
> cell-selection state to the camped normally state;
> 2> else if the reportType is set to eventTriggered and eventType is set to
> eventL1:
>> 3> if the UE is camping normally on an NR cell and if the RPLMN is
>> included in plmn-IdentityList stored in VarLogMeasReport and, if the cell is part of
>> the area indicated by areaConfiguration if configured in VarLogMeasConfig;
>>> 4> perform the logging at regular time intervals as defined by
>>> the loggingInterval in VarLogMeasConfig only when the conditions
>>> indicated by the eventL1 are met;
> 2> when performing the logging:
>> 3> set the relativeTimeStamp to indicate the elapsed time since the
>> moment at which the logged measurement configuration was received;
>> 3> if detailed location information became available during the last
>> logging interval, set the content of the locationInfo as in 5.3.3.7:
>> 3> if the UE is in any cell-selection state (as specified in TS 38.304
> [20]):
>>> 4> set anyCellSelectionDetected to indicate the detection
>>> of no suitable or no acceptable cell found;
>>> 4> set the servCellIdentity to indicate global cell identity of
>>> the last logged cell that the UE was camping on;
>>> 4> set the measResultServingCell to include the quantities
>>> of the last logged cell the UE was camping on;
>> 3> else:
>>> 4> set the servCellIdentity to indicate global cell identity of the
>>> cell the UE is camping on;
>>> 4> set the measResultServingCell to include the quantities of
>>> the cell the UE is camping on;
>>> 4> if available, set the measResultNeighCells, in order of
>>> decreasing ranking-criterion as used for cell re-selection, to include
>>> neighbouring cell measurements that became available during the last
>>> logging interval for at most the following number of neighbouring cells: 6
>>> intra-frequency and 3 inter-frequency neighbours per frequency as well as
>>> 3 inter-RAT neighbours, per frequency/ set of frequencies per RAT and
>>> according to the following:
>>>> 5> for each neighbour cell included, include the optional
>>>> fields that are available;

NOTE: The UE includes the latest results of the available measurements as used
for cell reselection evaluation in RRC_IDLE or RRC_INACTIVE, which are performed in
accordance with the performance requirements as specified in TS 38.133 [14].

\*\*\*\*\*\*\*\*\*\*\*\*\*\*\*\*\*\*\*\*\*\*\*\*\*\*\*

If the UE enters the any cell-selection state and if the UE is configured with the logged measurement configuration with reportType is set to eventTriggered and eventType is set to outOfCoverage, then the UE logs the relativeTimeStamp, locationInfo, anyCellSelectionDetected flag, serving cell identity of the last serving cell of the UE (servCellIdentity) and the corresponding measurements of the serving cell (measResultServingCell). The corresponding procedural text is bold above.

Also, if the UE is configured with the logged measurement configuration with reportType is set to eventTriggered and eventType is set to outOfCoverage and if the UE comes out of any cell-selection state, then the UE shall include the relativeTimeStamp, locationInfo, serving cell identity of the last serving cell of the UE (servCellIdentity), the corresponding measurements of the serving cell (measResultServingCell) and the measurements of the neighboring cells (measResultNeighCell). The corresponding procedural text is underlined above.

SUMMARY

As part of developing embodiments herein a problem was first identified. As can be seen from the above, the UE logs the identities and the measurements associated to the serving cell that serves the UE before entering the any cell-selection state and the serving cell that serves the UE after coming out of any cell-selection state. However, the UE does not check if the PLMN associated to such a serving cell belongs to the plmn-IdentityList as configured in the logged measurement configuration. So, it could happen that the UE ends up reporting the identities and measurements of serving cells that belongs to a different PLMN compared to the ones in which the UE was expected to log the measurements.

Consider the scenario shown in FIG. 1. In the scenario shown, the UE gets configured with a logged MDT configuration having a plmn-IdentityList that includes only PLMN1. However, the UE logs the measurements related to cell-B when it enters the any cell-selection state between Cell-B and Cell-C and also the measurements related to cell-C when it comes out of the any cell-selection state. When the UE comes back to PLMN1, then it will report the measurements related to cell-B and Cell-C in the logged MDT report. Thus, the PLMN1 collects measurements related to PLMN2 and PLMN3 in this example. In LTE, the issue captured in Problem-1 still exists for the periodic measurement reporting configuration of logged MDT when the UE enters the any cell-selection state.

An object herein is to provide a mechanism to handle measurements of a UE in an efficient manner in a wireless communications network.

According to an aspect the object is achieved, according to embodiments herein, by providing a method performed by a UE for handling measurements in a wireless communications network. The UE logs, when one or more conditions are fulfilled, a measurement associated to a last serving cell after entering an any cell-selection state, wherein the one or more conditions comprise: the last serving cell belongs to a PLMN, said PLMN is configured in the UE in a list of PLMN identities in a logged MDT configuration.

According to an aspect the object is achieved, according to embodiments herein, by providing a method performed by a radio network node for handling communication in a wireless communications network. The radio network node configures the UE to log a measurement associated to a last serving cell after entering an any cell-selection state when, or only if, one or more conditions are fulfilled. The one or more conditions comprise: the last serving cell belongs to a PLMN, said PLMN is configured in the UE in a network list of a logged MDT configuration.

Thus, the radio network node configures the UE to log the measurement: if the last serving cell belongs to a PLMN that is configured in the UE in a list such as a plmn-IdentityList of a logged MDT configuration.

According to an aspect the object is achieved, according to embodiments herein, by providing a UE and a radio network node configured to perform the methods herein, respectively.

Thus, it is herein disclosed a UE for handling measurements in a wireless communications network. The UE is configured to log, when one or more conditions are fulfilled, a measurement associated to a last serving cell after entering an any cell-selection state. The one or more conditions comprise: the last serving cell belongs to a PLMN, said PLMN is configured in the UE in a list of PLMN identities in a logged MDT configuration. Thus, the UE is configured to log the measurement: if the last serving cell belongs to a PLMN that is configured in the UE in a plmn-IdentityList of a logged MDT configuration.

Furthermore, it is herein disclosed a radio network node for handling communication in a wireless communications network. The radio network node is configured to configure the UE to log a measurement associated to a last serving cell after entering an any cell-selection state when one or more conditions are fulfilled. The one or more conditions comprise: the last serving cell belongs to a PLMN, said PLMN is configured in the UE in a list of PLMN identities in a logged MDT configuration. Thus, the radio network node is configured to configure the UE to log the measurement: if the last serving cell belongs to a PLMN that is configured in the UE in a plmn-IdentityList of a logged MDT configuration.

It is furthermore provided herein a computer program product comprising instructions, which, when executed on at least one processor, cause the at least one processor to carry out the method above, as performed by the UE or the radio network node, respectively. It is additionally provided herein a computer-readable storage medium, having stored thereon a computer program product comprising instructions which, when executed on at least one processor, cause the at least one processor to carry out the method according to the method above, as performed by the UE or the radio network node, respectively.

Embodiments herein disclose a solution that solves the mentioned problem by providing a method wherein the UE logs the measurement associated to the last serving cell after entering the any cell-selection state only if one or more conditions are fulfilled. The UE logs only measurements such as MDT measurements, if the one or more cells belong to a PLMN that is configured in the list of PLMN identities in the logged MDT configuration.

Other conditions may be:

If these one or more cells belong to an area configured by RAN using areaConfiguration of the logged MDT configuration.

Thus, also covering the combination—If these one or more cells belong to an area configured by RAN in area- Configuration and belong to certain PLMN as configured in the plmn-identityList of the logged MDT configuration.

Embodiments herein ensure that UE behavior is compliant with current MDT principles so that the UE only collects logged MDT report for allowed or configured PLMNs by network. Thus, the measurements are handled efficiently in the wireless communications network.

BRIEF DESCRIPTION OF THE DRAWINGS

Embodiments will now be described in more detail in relation to the enclosed drawings, in which.

DETAILED DESCRIPTION

Figure 1:
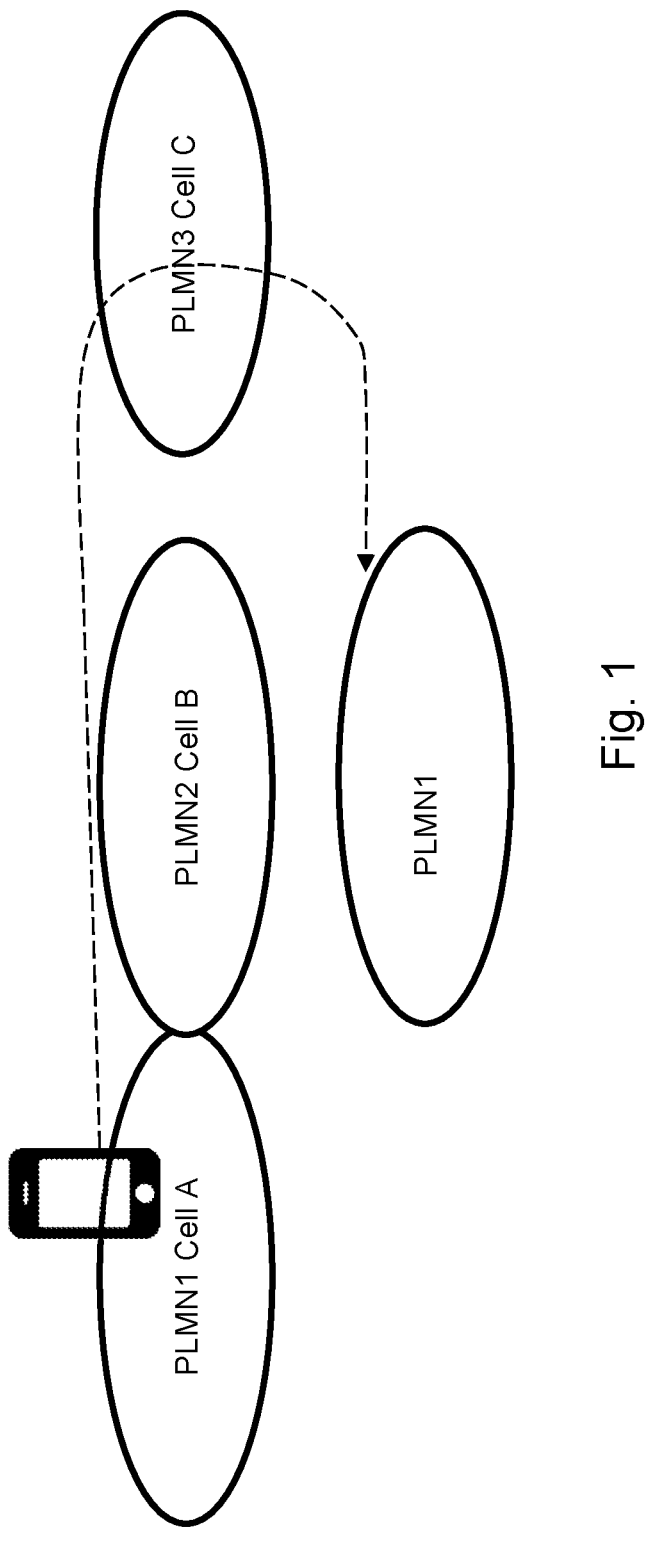
FIG. 1 shows a scenario according to prior art.
Figure 2:
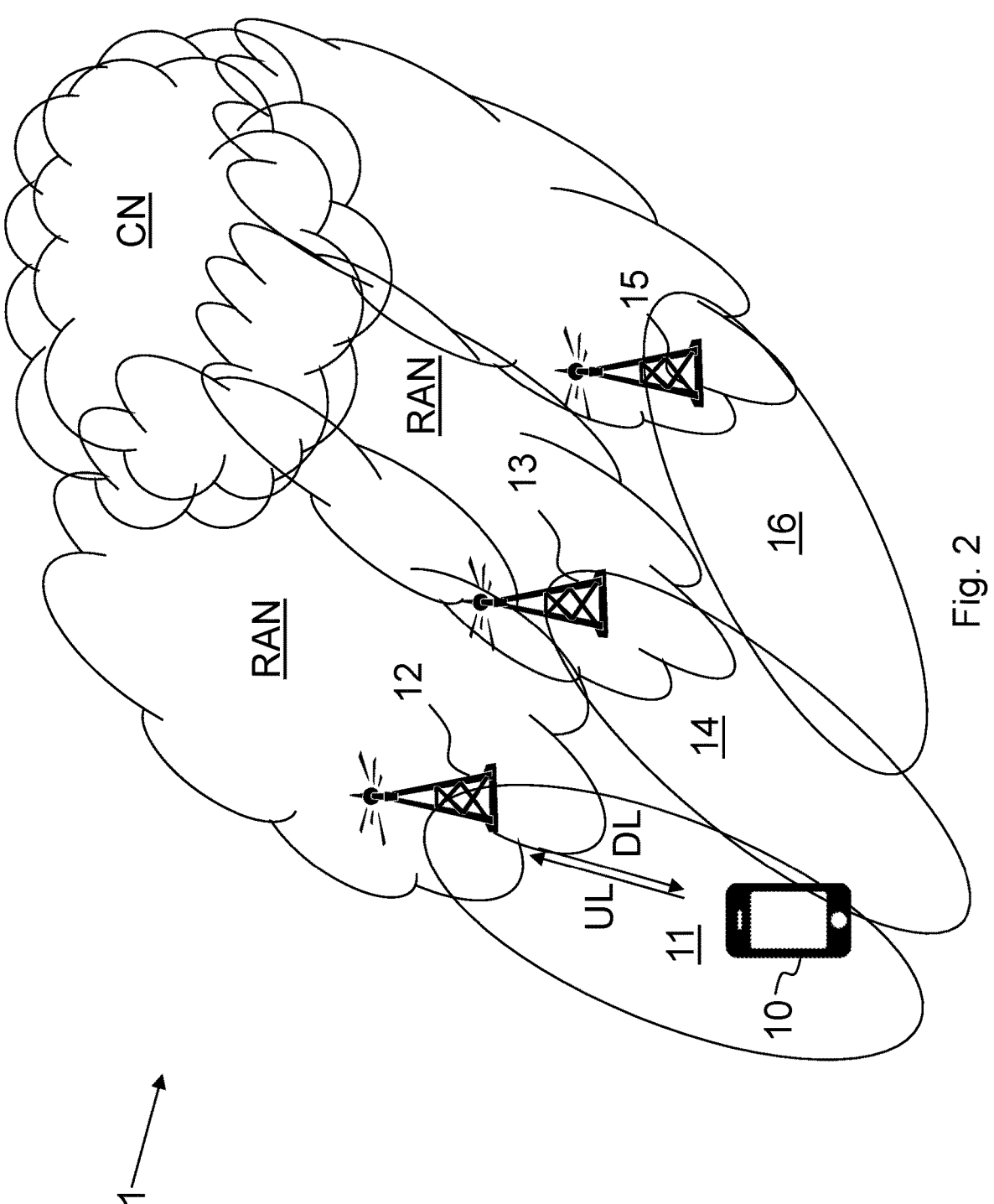
FIG. 2 shows an overview depicting a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in an NR context, however, embodiments are also applicable in further development of existing wireless communications systems such as e.g. LTE or WCDMA.

In the wireless communications network 1, a UE 10 exemplified herein as a wireless device such as a mobile station, a non-access point (non-AP) station (STA), a STA and/or a wireless terminal, is comprised communicating via e.g. one or more Access Networks (AN), e.g. RAN, to one or more CNs. It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The first radio network node 12 may be referred to as the radio network node or as a serving radio network node wherein the service area may be referred to as a serving cell, and the serving radio network node communicates with the UE 10 in form of DL transmissions to the UE 10 and UL transmissions from the UE 10. It should be noted that a service area may be denoted as cell, beam, beam group or similar to define an area of radio coverage.

The wireless communications network 1 comprises a second radio network node 13 providing radio coverage over a geographical area, a second service area 14 or second cell, of a second radio access technology (RAT), such as NR, LTE, or similar. The second radio network node 13 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the radio network node depending e.g. on the second radio access technology and terminology used. The second radio network node 13 may be referred to as a second PLMN radio network node wherein the service area may be referred to as a second PLMN cell.

The wireless communications network 1 comprises a third radio network node 15 providing radio coverage over a geographical area, a third service area 16 or third cell, of a third radio access technology (RAT), such as NR, LTE, or similar. The third radio network node 15 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the third radio network node 15 depending e.g. on the third radio access technology and terminology used. The third radio network node 15 may be referred to as a third PLMN radio network node wherein the service area may be referred to as a third PLMN cell.

According to embodiments herein the UE 10 is configured, either preconfigured or configured by the radio network node 12, to collect and log measurements of cells such as MDT measurement in the wireless communications network 1 with the proviso that one or more conditions are fulfilled. The one or more conditions comprise: the last serving cell belongs to a PLMN, said PLMN is configured in the UE 10 in a list of PLMN identities in a logged MDT configuration. For example, if the logged MDT configuration defines a PLMN list comprising PLMN 1 and PLMN 2 but not PLMN 3, then the UE 10 will not log MDT measurements at the time of entering any cell-selection state if the last serving cell was the third cell.

The one or more conditions are related to MDT configurations of the UE 10. In particular, area definition and/or PLMN definition of the MDT configuration. Embodiments ensure compliance of UE logging measurements according to network configurations.

Figure 3:
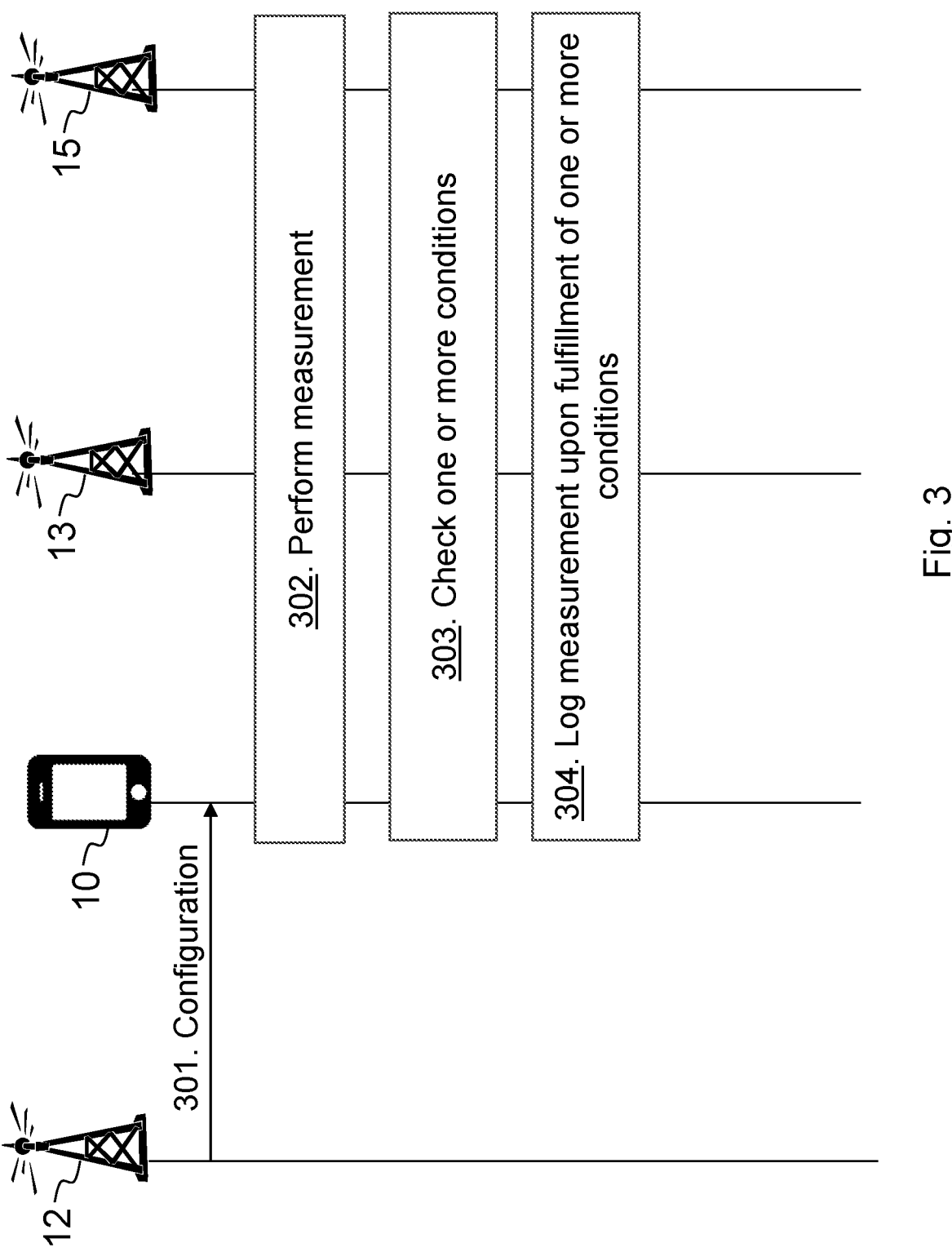
FIG. 3 shows a combined signalling scheme and flowchart depicting embodiments herein.

FIG. 3 is a combined signalling scheme and flowchart according to embodiments herein.

Action 301. The radio network node, exemplified herein as the first radio network node 12, transmits configuration data to the UE 10 for configuring the UE 10 to perform methods herein.

Action 302. The UE 10 performs measurements entering an any cell-selection state and/or coming from any cell-selection state. Any cell-selection state may be defined as a state wherein the UE 10 searches for an acceptable cell of any PLMN to camp on. If the UE 10 cannot find any acceptable cell, it stays in this state. The UE 10 may perform the measurement if a reportType is set to eventTriggered, and eventType is set to outOfCoverage, or the reportType is set to periodical and UE 10 is logging according to loggingInterval.

Action 303. The UE 10 may then check whether one or more conditions are fulfilled. The one or more conditions are related to MDT configurations of the UE 10. In particular, related to an area definition and/or PLMN definition of the MDT configuration.

Action 304. The UE 10 logs, (only) if the one or more conditions are fulfilled, the measurement associated to a last serving cell, being a last serving cell before entering the any cell-selection state and/or the measurement associated to a first serving cell after coming back from the any cell-selection state. For example, UE 10 logs the measurement: if the last serving cell and/or the first serving cell belongs to a PLMN that is configured in a list of PLMN identities, such as a plmn-IdentityList, in the logged MDT configuration; If the last serving cell and/or the first serving cell belongs to an area configured by RAN using areaConfiguration of the logged MDT configuration; and/or if the last serving cell and/or the first serving cell belongs to an area configured by RAN in areaConfiguration and belongs to certain PLMN as configured in the network list of the logged MDT configuration.

The UE 10 may then report the logged measurements to the radio network node 12 when entering the first cell.

In the embodiments described herein, several interchangeable terms/expressions are used to refer to an existing logged MDT configuration in the UE 10. These terms/expressions include "ongoing logged MDT configuration", "ongoing logged MDT measurement", "running logged MDT configuration", "running logged MDT measurement", "active logged MDT configuration", "ongoing logged MDT process", "existing logged MDT configuration" (and similar terms/expressions).

Figure 4:
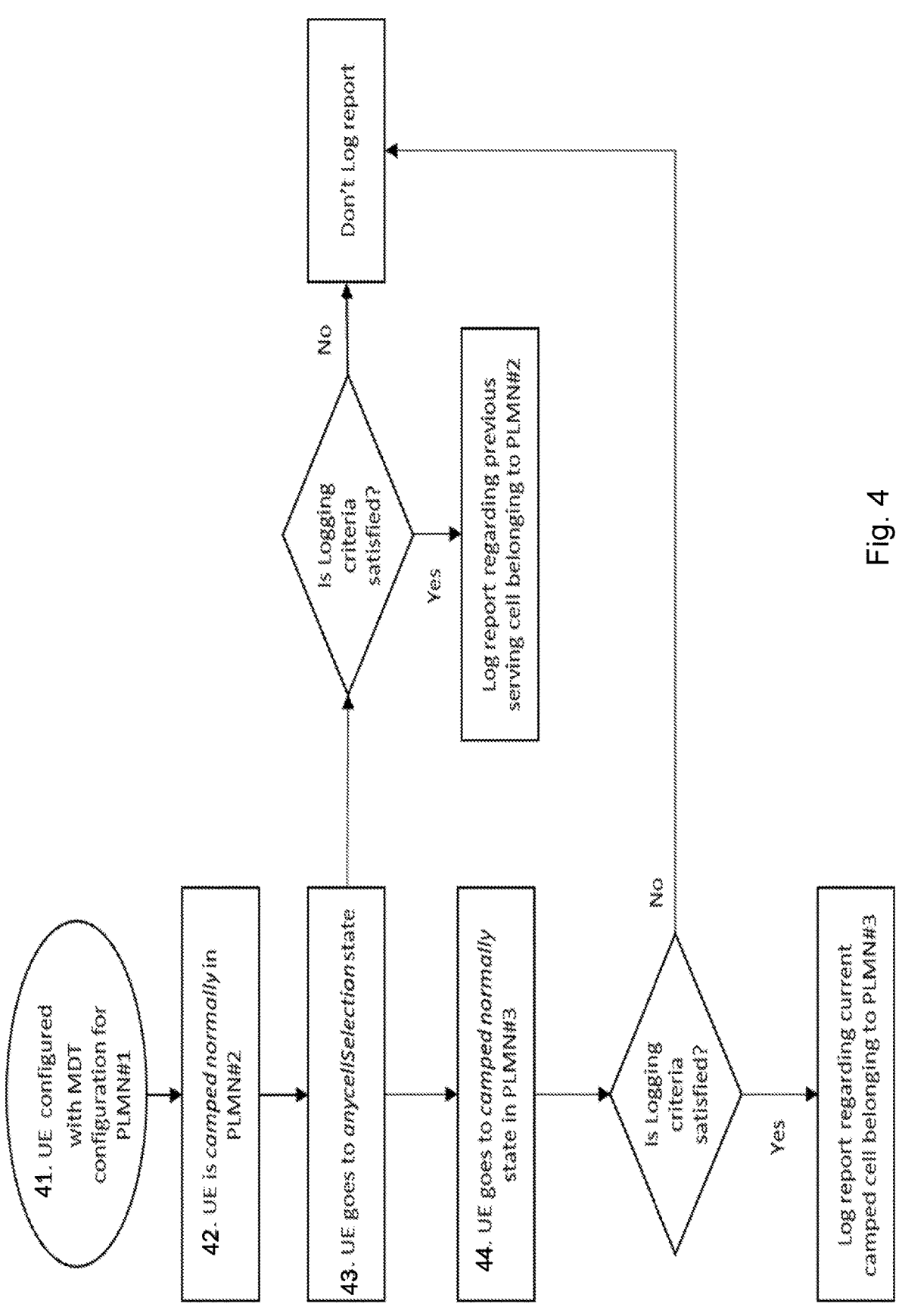
FIG. 4 shows a flowchart depicting a method performed by a UE according to embodiments herein.

The principles of some embodiments herein may be explained using FIG. 4.

Action 41. The UE 10 may be configured with an MDT configuration for PLMN #1.

Action 42. The UE 10 is camped normally in PLMN #2.

Action 43. The UE 10 goes to any cell-selection state from the camped normally state. Here the UE 10 may check whether one or more conditions or criteria, also referred to as logging criteria, are fulfilled such as if the last serving cell belongs to a PLMN that is configured, in the UE 10, in the list of PLMN identities, such as a plmn-IdentityList, in the MDT configuration of PLMN

1 and/or if the last serving cell belongs to an area configured by RAN using areaConfiguration of the MDT configuration for PLMN #1. If the condition is fulfilled the UE 10 logs a report regarding the last (previous) served cell (previous serving cell) belonging to PLMN #2, and if not fulfilled the UE 10 doesn't log the report, i.e., the measurement.

Action 44. The UE 10 goes to camped normally state in PLMN #3 from the any cell-selection state. Here the UE 10 may then check whether one or more conditions or criteria, also referred to as logging criteria, are fulfilled such as if the first serving cell belongs to a PLMN that is configured in the list such as a plmn-IdentityList of the MDT configuration of PLMN #1 and/or if the first serving cell belongs to an area configured by RAN using areaConfiguration of the MDT configuration for PLMN #1. If fulfilled the UE 10 logs a report regarding current camped cell (first serving cell) belonging to PLMN #3, and if not, the UE 10 doesn't log the report, i.e., measurement. Thus, the UE 10 in action 43 and action 44 always checks if the UE 10 can log measurements for the cell before logging. Below embodiments and associated examples show different alternatives of the mentioned conditions.

In one embodiment, the UE 10 checks if the cells belong to certain allowed PLMNs where it can collect and log measurement results.

The example implementation of this embodiment in text of TS 38.331 is captured below in bold text.
\*\*\*\*\*\*\*\*\*\*\*\*\*\*\*\*\*\*\*\*\*\*\*\*\*\*\*\*\*

---

While T330 is running, the UE shall:

1> perform the logging in accordance with the following:

2> if the reportType is set to periodical in the VarLogMeasConfig:

3> if the UE is camping normally on an NR cell and if the RPLMN is included in plmn-IdentityList stored in VarLogMeasReport and, if the cell is part of the area indicated by areaConfiguration if configured in VarLogMeasConfig:

4> perform the logging at regular time intervals, as defined by the loggingInterval in the VarLogMeasConfig;

2> else if the reportType is set to eventTriggered, and eventType is set to outOfCoverage:

3> perform the logging at regular time intervals as defined by the loggingInterval in VarLogMeasConfig only when the UE is in any cell-selection state;

3> Upon transition from any cell-selection state to camped normally state in NR:

4> if the RPLMN is included in plmn-IdentityList stored in VarLogMeasReport;

5> perform the logging;

2> else if the reportType is set to eventTriggered and eventType is set to eventL1:

3> if the UE is camping normally on an NR cell and if the RPLMN is included in plmn-IdentityList stored in VarLogMeasReport and, if the cell is part of the area indicated by areaConfiguration if configured in VarLogMeasConfig;

4> perform the logging at regular time intervals as defined by the loggingInterval in VarLogMeasConfig only when the conditions indicated by the eventLl are met;

2> when performing the logging:

3> set the relativeTimeStamp to indicate the elapsed time since the moment at which the logged measurement configuration was received;

3> if detailed location information became available during the last logging interval, set the content of the locationInfo as in 5.3.3.7:

3> if the UE is in any cell-selection state (as specified in TS 38.304 [20]):

4> set anyCellSelectionDetected to indicate the detection of no suitable or no acceptable cell found;

4> if the RPLMN at the time of entering the any cell-selection state is included in plmn-IdentityList stored in VarLogMeasReport;

5> set the servCellIdentity to indicate global cell identity of the last logged cell that the UE was camping on;

5> set the measResultServingCell to include the quantities of the last logged cell the UE was camping on;

3> else:

4> set the servCellIdentity to indicate global cell identity of the cell the UE is camping on;

4> set the measResultServingCell to include the quantities of the cell the UE is camping on;

4> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/ set of frequencies per RAT and according to the following:

5> for each neighbour cell included, include the optional fields that are available;

NOTE:

The UE includes the latest results of the available measurements as used for cell reselection evaluation in RRC_IDLE or RRC_INACTIVE, which are performed in accordance with the performance requirements as specified in TS 38.133 [14].

2> when the memory reserved for the logged measurement information becomes full, stop timer T330 and perform the same actions as performed upon expiry of T330, as specified in 5.5a.1.4.

\*\*\*\*\*\*\*\*\*\*\*\*\*\*\*\*\*\*\*\*\*\*\*\*\*\*\*

The example implementation of this embodiment in text of TS 36.331 is captured below in bold text.

\*\*\*\*\*\*\*\*\*\*\*\*\*\*\*\*\*\*\*\*\*\*\*\*\*\*\*\*\*

While T330 is running, the UE shall:

1> if measurement logging is suspended:

2> if during the last logging interval the IDC problems detected by the UE is resolved, resume measurement logging;

1> if not suspended, perform the logging in accordance with the following:

2> if targetMBSFN-AreaList is included in VarLogMeasConfig:

3> if the UE is camping normally on an E-UTRA cell or is connected to E-UTRA; and 3> if the RPLMN is included in plmn-IdentityList stored in VarLogMeasReport; and 3> if the PCell (in RRC_CONNECTED) or cell where the UE is camping (in RRC_IDLE) is part of the area indicated by areaConfiguration if configured in VarLogMeasConfig:

4> for MBSFN areas, indicated in targetMBSFN-AreaList, from which the UE is receiving MBMS service:

5> perform MBSFN measurements in accordance with the performance requirements as specified in TS 36.133 [16];

NOTE 1: When configured to perform MBSFN measurement logging by targetMBSFN-AreaList, the UE is not required to receive additional MBSFN subframes, i.e. logging is based on the subframes corresponding to the MBMS services the UE is receiving.

5> perform logging at regular time intervals as defined by the loggingInterval in VarLogMeasConfig, but only for those intervals for which MBSFN measurement results are available as specified in TS 36.133 [16];

2> else if:

3> if the UE is in any cell-selection state (as specified in TS 36.304 [4]):

4> perform the logging at regular time intervals, as defined by the loggingInterval in VarLogMeasConfig;

3> else if the UE is camping normally on an E-UTRA cell and if the RPLMN is included in plmn-IdentityList stored in VarLogMeasReport and, if the cell is part of the area indicated by areaConfiguration if configured in VarLogMeasConfig:

4> perform the logging at regular time intervals, as defined by the loggingInterval in VarLogMeasConfig;

2> when adding a logged measurement entry in VarLogMeasReport, include the fields in accordance with the following:

3> if the UE detected IDC problems during the last logging interval:

4> if measResultServCell in VarLogMeasReport is not empty:

5> include InDeviceCoexDetected;

5> suspend measurement logging from the next logging interval;

4> else:

5> suspend measurement logging;

NOTE 1A: The UE may detect the start of IDC problems as early as Phase 1 as described in clause 23.4 of TS 36.300 [9].

3> set the relativeTimeStamp to indicate the elapsed time since the moment at which the logged measurement configuration was received;

3> if detailed location information became available during the last logging interval, set the content of the locationInfo as follows:

4> include the locationCoordinates;

3> if wlan-NameList is included in VarLogMeasConfig:

4> if detailed WLAN measurements are available:

5> include logMeasResultListWLAN, in order of decreasing RSSI for WLAN APs;

3> if bt-NameList is included in VarLogMeasConfig:

4> if detailed Bluetooth measurements are available:

5> include logMeasResultListBT, in order of decreasing RSSI for Bluetooth beacons;

3> if targetMBSFN-AreaList is included in VarLogMeasConfig:

4> for each MBSFN area, for which the mandatory measurements result fields became available during the last logging interval:

5> set the rsrpResultMBSFN, rsrqResultMBSFN to include measurement results that became available during the last logging interval;

5> include the fields signallingBLER-Result or dataBLER-MCH-ResultList if the concerned BLER results are availble, 5> set the mbsfn-AreaId and carrierFrequency to indicate the MBSFN area in which the UE is receiving MBSFN transmission;

4> if in RRC_CONNECTED:

5> set the servCellIdentity to indicate global cell identity of the PCell;

5> set the measResultServCell to include the layer 3 filtered measured results of the PCell;

5> if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:

6> for each cell included, include the optional fields that are available;

-continued

5> if available, optionally set the measResultNeighCells to include the layer 3 filtered
measured results of neighbouring cell(s) measurements that became available during the
last logging interval, in order of decreasing
RSCP(UTRA)/RSSI(GERAN)/PilotStrength(cdma2000), for at most the following
number of cells: 3 inter-RAT cells per frequency (UTRA, cdma2000)/set of frequencies
(GERAN), and according to the following:
6> for each cell included, include the optional fields that are available;
4> if in RRC_IDLE:
5> set the servCellIdentity to indicate global cell identity of the serving cell;
5> set the measResultServCell to include the quantities of the serving cell;
5> if available, set the measResultNeighCells, in order of decreasing ranking-criterion as
used for cell re-selection, to include neighbouring cell measurements that became
available during the last logging interval for at most the following number of
neighbouring cells: 6 intra-frequency and 3 inter-frequency neighbours per frequency
and according to the following:
6> for each neighbour cell included, include the optional fields that are available;
5> if available, optionally set the measResultNeighCells, in order of decreasing ranking-
criterion as used for cell re-selection, to include neighbouring cell measurements that
became available during the last logging interval, for at most the following number of
cells: 3 inter-RAT cells per frequency (UTRA, cdma2000)/set of frequencies
(GERAN), and according to the following:
6> for each cell included, include the optional fields that are available;
4> for the cells included according to the previous (i.e. covering previous and current serving
cells as well as neighbouring EUTRA cells) include results according to the extended
RSRQ if corresponding results are available according to the associated performance
requirements defined in TS 36.133 [16];
4> for the cells included according to the previous (i.e. covering previous and current serving
cells as well as neighbouring EUTRA cells) include RSRQ type if the result was based on
measurements using a wider band or using all OFDM symbols;
NOTE 2: The UE includes the latest results in accordance with the performance requirements as
specified in TS 36.133 [16]. E.g. RSRP and RSRQ results are available only if the UE has a
sufficient number of results/ receives a sufficient number of subframes during the logging
interval.
3> else:
4> if the UE is in any cell-selection state (as specified in TS 36.304 [4]):
5> set anyCellSelectionDetected to indicate the detection of no suitable or no acceptable
cell found;
**5> if the RPLMN at the time of entering the any cell-selection state is included in
plmn-IdentityList stored in VarLogMeasReport;**
6> set the servCellIdentity to indicate global cell identity of the last logged cell that the
UE was camping on;
6> set the measResultServCell to include the quantities of the last logged cell the UE
was camping on;
4> else:
5> set the servCellIdentity to indicate global cell identity of the cell the UE is camping on;
5> set the measResultServCell to include the quantities of the cell the UE is camping on;
4> if available, set the measResultNeighCells, in order of decreasing ranking-criterion as used
for cell re-selection, to include neighbouring cell measurements that became available
during the last logging interval for at most the following number of neighbouring cells: 6
intra-frequency and 3 inter-frequency neighbours per frequency as well as 3 inter-RAT
neighbours, per frequency/ set of frequencies (GERAN) per RAT and according to the
following:
5> for each neighbour cell included, include the optional fields that are available;
4> for the cells included according to the previous (i.e. covering previous and current serving
cells as well as neighbouring EUTRA cells) include results according to the extended
RSRQ if corresponding results are available according to the associated performance
requirements defined in TS 36.133 [16];
4> for the cells included according to the previous (i.e. covering previous and current serving
cells as well as neighbouring EUTRA cells) include RSRQ type if the result was based on
measurements using a wider band or using all OFDM symbols;
NOTE 3: The UE includes the latest results of the available measurements as used for cell reselection
evaluation in RRC_IDLE or as used for evaluation of reporting criteria or for measurement
reporting according to 5.5.3 in RRC_CONNECTED, which are performed in accordance with
the performance requirements as specified in TS 36.133 [16].
2> when the memory reserved for the logged measurement information becomes full, stop timer T330
and perform the same actions as performed upon expiry of T330, as specified in 5.6.6.4;

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*

In another embodiment, the UE checks if the cells belong to
certain area as configured in areaConfig of areaConfigura-
tion IE in the logged MDT configurations.

The example implementation of this embodiment in text of
TS 38.331 is captured below in bold text.

\*\*\*\*\*\*\*\*\*\*\*\*\*\*\*\*\*\*\*\*\*\*\*\*\*\*\*\*

---

While T330 is running, the UE shall:

1> perform the logging in accordance with the following:

2> if the reportType is set to periodical in the VarLogMeasConfig:

3> if the UE is camping normally on an NR cell and if the RPLMN is included in plmn-IdentityList stored in VarLogMeasReport and, if the cell is part of the area indicated by areaConfiguration if configured in VarLogMeasConfig:

4> perform the logging at regular time intervals, as defined by the loggingInterval in the VarLogMeasConfig;

2> else if the reportType is set to eventTriggered, and eventType is set to outOfCoverage:

3> perform the logging at regular time intervals as defined by the loggingInterval in VarLogMeasConfig only when the UE is in any cell-selection state;

3> Upon transition from any cell-selection state to camped normally state in NR:

4> if the current camping cell is part of the area indicated by areaConfig of areaConfiguration, if configured in VarLogMeasConfig:

5> perform the logging;

2> else if the reportType is set to eventTriggered and eventType is set to eventL1:

3> if the UE is camping normally on an NR cell and if the RPLMN is included in plmn-IdentityList stored in VarLogMeasReport and, if the cell is part of the area indicated by areaConfiguration if configured in VarLogMeasConfig;

4> perform the logging at regular time intervals as defined by the loggingInterval in VarLogMeasConfig only when the conditions indicated by the eventL1 are met;

2> when performing the logging:

3> set the relativeTimeStamp to indicate the elapsed time since the moment at which the logged measurement configuration was received;

3> if detailed location information became available during the last logging interval, set the content of the locationInfo as in 5.3.3.7:

3> if the UE is in any cell-selection state (as specified in TS 38.304 [20]):

4> set anyCellSelectionDetected to indicate the detection of no suitable or no acceptable cell found;

4> if the last serving cell while in camped normally state is part of the area indicated by areaConfig of areaConfiguration if configured in VarLogMeasConfig:

5> set the servCellIdentity to indicate global cell identity of the last logged cell that the UE was camping on;

5> set the measResultServingCell to include the quantities of the last logged cell the UE was camping on;

3> else:

4> set the servCellIdentity to indicate global cell identity of the cell the UE is camping on;

4> set the measResultServingCell to include the quantities of the cell the UE is camping on;

4> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/ set of frequencies per RAT and according to the following:

5> for each neighbour cell included, include the optional fields that are available;

NOTE:  The UE includes the latest results of the available measurements as used for cell reselection evaluation in RRC_IDLE or RRC_INACTIVE, which are performed in accordance with the performance requirements as specified in TS 38.133 [14].

2> when the memory reserved for the logged measurement information becomes full, stop timer T330 and perform the same actions as performed upon expiry of T330, as specified in 5.5a.1.4.

---

\*\*\*\*\*\*\*\*\*\*\*\*\*\*\*\*\*\*\*\*\*\*\*\*\*\*\*\*

The example implementation of this embodiment in text
from TS 36.331 is captured below in bold text.

\*\*\*\*\*\*\*\*\*\*\*\*\*\*\*\*\*\*\*\*\*\*\*\*\*\*\*\*\*\*

---

While T330 is running, the UE shall:

1> if measurement logging is suspended:

2> if during the last logging interval the IDC problems detected by the UE is resolved, resume measurement logging;

1> if not suspended, perform the logging in accordance with the following:

2> if targetMBSFN-AreaList is included in VarLogMeasConfig:

3> if the UE is camping normally on an E-UTRA cell or is connected to E-UTRA; and 3> if the RPLMN is included in plmn-IdentityList stored in VarLogMeasReport; and 3> if the PCell (in RRC_CONNECTED) or cell where the UE is camping (in RRC_IDLE) is part of the area indicated by areaConfiguration if configured in Var LogMeasConfig:

-continued

4> for MBSFN areas, indicated in targetMBSFN-AreaList, from which the UE is receiving
   MBMS service:
   5> perform MBSFN measurements in accordance with the performance requirements as
      specified in TS 36.133 [16];
NOTE 1: When configured to perform MBSFN measurement logging by targetMBSFN-AreaList, the
   UE is not required to receive additional MBSFN subframes, i.e. logging is based on the
   subframes corresponding to the MBMS services the UE is receiving.
   5> perform logging at regular time intervals as defined by the loggingInterval in
      VarLogMeasConfig, but only for those intervals for which MBSFN measurement
      results are available as specified in TS 36.133 [16];
2> else if:
   3> if the UE is in any cell-selection state (as specified in TS 36.304 [4]):
      4> perform the logging at regular time intervals, as defined by the loggingInterval in
         VarLogMeasConfig;
   3> else if the UE is camping normally on an E-UTRA cell and if the RPLMN is included in plmn-
      IdentityList stored in VarLogMeasReport and, if the cell is part of the area indicated by
      areaConfiguration if configured in VarLogMeasConfig:
      4> perform the logging at regular time intervals, as defined by the loggingInterval in
         VarLogMeasConfig;
2> when adding a logged measurement entry in VarLogMeasReport, include the fields in accordance
   with the following:
   3> if the UE detected IDC problems during the last logging interval:
      4> if measResultServCell in VarLogMeasReport is not empty:
         5> include InDeviceCoexDetected;
         5> suspend measurement logging from the next logging interval;
      4> else:
         5> suspend measurement logging;
NOTE 1A:   The UE may detect the start of IDC problems as early as Phase 1 as described in clause
   23.4 of TS 36.300 [9].
   3> set the relativeTimeStamp to indicate the elapsed time since the moment at which the logged
      measurement configuration was received;
   3> if detailed location information became available during the last logging interval, set the
      content of the locationInfo as follows:
      4> include the locationCoordinates;
   3> if wlan-NameList is included in VarLogMeasConfig:
      4> if detailed WLAN measurements are available:
         5> include logMeasResultListWLAN, in order of decreasing RSSI for WLAN APs;
   3> if bt-NameList is included in VarLogMeasConfig:
      4> if detailed Bluetooth measurements are available:
         5> include logMeasResultListBT, in order of decreasing RSSI for Bluetooth beacons;
   3> if targetMBSFN-AreaList is included in VarLogMeasConfig:
      4> for each MBSFN area, for which the mandatory measurements result fields became
         available during the last logging interval:
         5> set the rsrpResultMBSFN, rsrqResultMBSFN to include measurement results that
            became available during the last logging interval;
         5> include the fields signallingBLER-Result or data BLER-MCH-ResultList if the
            concerned BLER results are availble,
         5> set the mbsfn-AreaId and carrierFrequency to indicate the MBSFN area in which the
            UE is receiving MBSFN transmission;
      4> if in RRC_CONNECTED:
         5> set the servCellIdentity to indicate global cell identity of the PCell;
         5> set the measResultServCell to include the layer 3 filtered measured results of the PCell;
         5> if available, set the measResultNeighCells to include the layer 3 filtered measured
            results of SCell(s) and neighbouring cell(s) measurements that became available during
            the last logging interval, in order of decreasing RSRP, for at most the following number
            of cells: 6 intra-frequency and 3 inter-frequency cells per frequency and according to
            the following:
            6> for each cell included, include the optional fields that are available;
         5> if available, optionally set the measResultNeighCells to include the layer 3 filtered
            measured results of neighbouring cell(s) measurements that became available during the
            last logging interval, in order of decreasing
            RSCP(UTRA)/RSSI(GERAN)/PilotStrength(cdma2000), for at most the following
            number of cells: 3 inter-RAT cells per frequency (UTRA, cdma2000)/set of frequencies
            (GERAN), and according to the following:
            6> for each cell included, include the optional fields that are available;
      4> if in RRC_IDLE:
         5> set the servCellIdentity to indicate global cell identity of the serving cell;
         5> set the measResultServCell to include the quantities of the serving cell;
         5> if available, set the measResultNeighCells, in order of decreasing ranking-criterion as
            used for cell re-selection, to include neighbouring cell measurements that became
            available during the last logging interval for at most the following number of
            neighbouring cells: 6 intra-frequency and 3 inter-frequency neighbours per frequency
            and according to the following:
            6> for each neighbour cell included, include the optional fields that are available;

-continued

5> if available, optionally set the measResultNeighCells, in order of decreasing ranking-
          criterion as used for cell re-selection, to include neighbouring cell measurements that
          became available during the last logging interval, for at most the following number of
          cells: 3 inter-RAT cells per frequency (UTRA, cdma2000)/set of frequencies
          (GERAN), and according to the following:
            6> for each cell included, include the optional fields that are available;
      4> for the cells included according to the previous (i.e. covering previous and current serving
        cells as well as neighbouring EUTRA cells) include results according to the extended
        RSRQ if corresponding results are available according to the associated performance
        requirements defined in TS 36.133 [16];
      4> for the cells included according to the previous (i.e. covering previous and current serving
        cells as well as neighbouring EUTRA cells) include RSRQ type if the result was based on
        measurements using a wider band or using all OFDM symbols;
NOTE 2: The UE includes the latest results in accordance with the performance requirements as
      specified in TS 36.133 [16]. E.g. RSRP and RSRQ results are available only if the UE has a
      sufficient number of results/ receives a sufficient number of subframes during the logging
      interval.
   3> else:
      4> if the UE is in any cell-selection state (as specified in TS 36.304 [4]):
        5> set anyCellSelectionDetected to indicate the detection of no suitable or no acceptable
          cell found;
        5> if the last serving cell while in camped normally state is part of the area indicated
        by areaConfiguration if configured in VarLogMeasConfig:
          6> set the servCellIdentity to indicate global cell identity of the last logged cell that the
            UE was camping on;
          6> set the measResultServCell to include the quantities of the last logged cell the UE
            was camping on;
      4> else:
        5> set the servCellIdentity to indicate global cell identity of the cell the UE is camping on;
        5> set the measResultServCell to include the quantities of the cell the UE is camping on;
      4> if available, set the measResultNeighCells, in order of decreasing ranking-criterion as used
        for cell re-selection, to include neighbouring cell measurements that became available
        during the last logging interval for at most the following number of neighbouring cells: 6
        intra-frequency and 3 inter-frequency neighbours per frequency as well as 3 inter-RAT
        neighbours, per frequency/ set of frequencies (GERAN) per RAT and according to the
        following:
        5> for each neighbour cell included, include the optional fields that are available;
      4> for the cells included according to the previous (i.e. covering previous and current serving
        cells as well as neighbouring EUTRA cells) include results according to the extended
        RSRQ if corresponding results are available according to the associated performance
        requirements defined in TS 36.133 [16];
      4> for the cells included according to the previous (i.e. covering previous and current serving
        cells as well as neighbouring EUTRA cells) include RSRQ type if the result was based on
        measurements using a wider band or using all OFDM symbols;
NOTE 3: The UE includes the latest results of the available measurements as used for cell reselection
      evaluation in RRC_IDLE or as used for evaluation of reporting criteria or for measurement
      reporting according to 5.5.3 in RRC_CONNECTED, which are performed in accordance with
      the performance requirements as specified in TS 36.133 [16].
  2> when the memory reserved for the logged measurement information becomes full, stop timer T330
    and perform the same actions as performed upon expiry of T330, as specified in 5.6.6.4;

\*\*\*\*\*\*\*\*\*\*\*\*\*\*\*\*\*\*\*\*\*\*\*\*\*\*\*\*\*\*\*\*\*\*\*\*\*\*\*\*\*\*\*\*      45
\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*

In yet another embodiment, the UE checks if the cells belong
to a certain allowed PLMN as configured in plmn-identi-
tyList and certain area as configured in AreaConfiguration
IE.
The example implementation of this embodiment in TS
38.331 is captured below in bold text.
\*\*\*\*\*\*\*\*\*\*\*\*\*\*\*\*\*\*\*\*\*\*\*\*\*\*

While T330 is running, the UE shall:

1> perform the logging in accordance with the following:

2> if the reportType is set to periodical in the VarLogMeasConfig:

3> if the UE is camping normally on an NR cell and if the RPLMN is included in plmn- IdentityList stored in Var LogMeasReport and, if the cell is part of the area indicated by areaConfiguration if configured in VarLogMeasConfig:

4> perform the logging at regular time intervals, as defined by the loggingInterval in the VarLogMeasConfig;

-continued

2> else if the reportType is set to eventTriggered, and eventType is set to outOfCoverage:
   3> perform the logging at regular time intervals as defined by the loggingInterval in
      VarLogMeasConfig only when the UE is in any cell-selection state;
   3> Upon transition from any cell-selection state to camped normally state in NR:
      4> if the RPLMN is included in plmn-IdentityList stored in VarLogMeasReport: and
      4> if the current camping cell is part of the area indicated by areaConfig of
      areaConfiguration, if configured in VarLogMeasConfig:
         5> perform the logging;
2> else if the reportType is set to eventTriggered and eventType is set to eventL1:
   3> if the UE is camping normally on an NR cell and if the RPLMN is included in plmn-
      IdentityList stored in VarLogMeasReport and, if the cell is part of the area indicated by
      areaConfiguration if configured in VarLogMeasConfig;
      4> perform the logging at regular time intervals as defined by the loggingInterval in
         VarLogMeasConfig only when the conditions indicated by the eventL1 are met;
2> when performing the logging:
   3> set the relativeTimeStamp to indicate the elapsed time since the moment at which the logged
      measurement configuration was received;
   3> if detailed location information became available during the last logging interval, set the
      content of the locationInfo as in 5.3.3.7:
   3> if the UE is in any cell-selection state (as specified in TS 38.304 [20]):
      4> set anyCellSelectionDetected to indicate the detection of no suitable or no acceptable cell
         found;
      4> if the RPLMN at the time of entering the any cell-selection state is included in plmn-
      IdentityList stored in VarLogMeasReport : and
      4> if the last serving cell while in camped normally state is part of the area indicated by
      areaConfig of areaConfiguration if configured in VarLogMeasConfig:
         5> set the servCellIdentity to indicate global cell identity of the last logged cell that the UE
            was camping on;
         5> set the measResultServingCell to include the quantities of the last logged cell the UE
            was camping on;
   3> else:
      4> set the servCellIdentity to indicate global cell identity of the cell the UE is camping on;
      4> set the measResultServingCell to include the quantities of the cell the UE is camping on;
      4> if available, set the measResultNeighCells, in order of decreasing ranking-criterion as used
         for cell re-selection, to include neighbouring cell measurements that became available
         during the last logging interval for at most the following number of neighbouring cells: 6
         intra-frequency and 3 inter-frequency neighbours per frequency as well as 3 inter-RAT
         neighbours, per frequency/ set of frequencies per RAT and according to the following:
         5> for each neighbour cell included, include the optional fields that are available;
NOTE:   The UE includes the latest results of the available measurements as used for cell reselection
      evaluation in RRC_IDLE or RRC_INACTIVE, which are performed in accordance with the
      performance requirements as specified in TS 38.133 [14].
2> when the memory reserved for the logged measurement information becomes full, stop timer T330
   and perform the same actions as performed upon expiry of T330, as specified in 5.5a.1.4.

40

\*\*\*\*\*\*\*\*\*\*\*\*\*\*\*\*\*\*\*\*\*\*\*\*\*\*

The example implementation of this embodiment in text of
TS 36.331 captured below in bold text.
\*\*\*\*\*\*\*\*\*\*\*\*\*\*\*\*\*\*\*\*\*\*\*\*\*\*\*\*\*\*

While T330 is running, the UE shall:
  1> if measurement logging is suspended:
    2> if during the last logging interval the IDC problems detected by the UE is resolved, resume
       measurement logging;
  1> if not suspended, perform the logging in accordance with the following:
    2> if targetMBSFN-AreaList is included in VarLogMeasConfig:
      3> if the UE is camping normally on an E-UTRA cell or is connected to E-UTRA; and
      3> if the RPLMN is included in plmn-IdentityList stored in VarLogMeasReport; and
      3> if the PCell (in RRC_CONNECTED) or cell where the UE is camping (in RRC_IDLE) is part
         of the area indicated by areaConfiguration if configured in VarLogMeasConfig:
         4> for MBSFN areas, indicated in targetMBSFN-AreaList, from which the UE is receiving
            MBMS service:
            5> perform MBSFN measurements in accordance with the performance requirements as
               specified in TS 36.133 [16];
NOTE 1: When configured to perform MBSFN measurement logging by targetMBSFN-AreaList, the
      UE is not required to receive additional MBSFN subframes, i.e. logging is based on the
      subframes corresponding to the MBMS services the UE is receiving.
            5> perform logging at regular time intervals as defined by the loggingInterval in
               VarLogMeasConfig, but only for those intervals for which MBSFN measurement
               results are available as specified in TS 36.133 [16];

-continued

2> else if:
  3> if the UE is in any cell-selection state (as specified in TS 36.304 [4]):
    4> perform the logging at regular time intervals, as defined by the loggingInterval in
      VarLogMeasConfig;
  3> else if the UE is camping normally on an E-UTRA cell and if the RPLMN is included in plmn-
    IdentityList stored in VarLogMeasReport and, if the cell is part of the area indicated by
    areaConfiguration if configured in VarLogMeasConfig:
    4> perform the logging at regular time intervals, as defined by the loggingInterval in
      VarLogMeasConfig;
  2> when adding a logged measurement entry in VarLogMeasReport, include the fields in accordance
    with the following:
    3> if the UE detected IDC problems during the last logging interval:
      4> if measResultServCell in VarLogMeasReport is not empty:
        5> include InDeviceCoexDetected;
        5> suspend measurement logging from the next logging interval;
      4> else:
        5> suspend measurement logging;
NOTE 1A:   The UE may detect the start of IDC problems as early as Phase 1 as described in clause
      23.4 of TS 36.300 [9].
    3> set the relativeTimeStamp to indicate the elapsed time since the moment at which the logged
      measurement configuration was received;
    3> if detailed location information became available during the last logging interval, set the
      content of the locationInfo as follows:
      4> include the locationCoordinates;
    3> if wlan-NameList is included in VarLogMeasConfig:
      4> if detailed WLAN measurements are available:
        5> include logMeasResultListWLAN, in order of decreasing RSSI for WLAN APs;
    3> if bt-NameList is included in VarLogMeasConfig:
      4> if detailed Bluetooth measurements are available:
        5> include logMeasResultListBT, in order of decreasing RSSI for Bluetooth beacons;
    3> if targetMBSFN-AreaList is included in VarLogMeasConfig:
      4> for each MBSFN area, for which the mandatory measurements result fields became
        available during the last logging interval:
        5> set the rsrpResultMBSFN, rsrqResultMBSFN to include measurement results that
          became available during the last logging interval;
        5> include the fields signallingBLER-Result or dataBLER-MCH-ResultList if the
          concerned BLER results are availble,
        5> set the mbsfn-AreaId and carrierFrequency to indicate the MBSFN area in which the
          UE is receiving MBSFN transmission;
      4> if in RRC_CONNECTED:
        5> set the servCellIdentity to indicate global cell identity of the PCell;
        5> set the measResultServCell to include the layer 3 filtered measured results of the PCell;
        5> if available, set the measResultNeighCells to include the layer 3 filtered measured
          results of SCell(s) and neighbouring cell(s) measurements that became available during
          the last logging interval, in order of decreasing RSRP, for at most the following number
          of cells: 6 intra-frequency and 3 inter-frequency cells per frequency and according to
          the following:
          6> for each cell included, include the optional fields that are available;
        5> if available, optionally set the measResultNeighCells to include the layer 3 filtered
          measured results of neighbouring cell(s) measurements that became available during the
          last logging interval, in order of decreasing
          RSCP(UTRA)/RSSI(GERAN)/PilotStrength(cdma2000), for at most the following
          number of cells: 3 inter-RAT cells per frequency (UTRA, cdma2000)/set of frequencies
          (GERAN), and according to the following:
          6> for each cell included, include the optional fields that are available;
      4> if in RRC_IDLE:
        5> set the servCellIdentity to indicate global cell identity of the serving cell;
        5> set the measResultServCell to include the quantities of the serving cell;
        5> if available, set the measResultNeighCells, in order of decreasing ranking-criterion as
          used for cell re-selection, to include neighbouring cell measurements that became
          available during the last logging interval for at most the following number of
          neighbouring cells: 6 intra-frequency and 3 inter-frequency neighbours per frequency
          and according to the following:
          6> for each neighbour cell included, include the optional fields that are available;
        5> if available, optionally set the measResultNeighCells, in order of decreasing ranking-
          criterion as used for cell re-selection, to include neighbouring cell measurements that
          became available during the last logging interval, for at most the following number of
          cells: 3 inter-RAT cells per frequency (UTRA, cdma2000)/set of frequencies
          (GERAN), and according to the following:
          6> for each cell included, include the optional fields that are available;
      4> for the cells included according to the previous (i.e. covering previous and current serving
        cells as well as neighbouring EUTRA cells) include results according to the extended
        RSRQ if corresponding results are available according to the associated performance
        requirements defined in TS 36.133 [16];

-continued

---

```
    4> for the cells included according to the previous (i.e. covering previous and current serving
         cells as well as neighbouring EUTRA cells) include RSRQ type if the result was based on
         measurements using a wider band or using all OFDM symbols;
NOTE 2: The UE includes the latest results in accordance with the performance requirements as
         specified in TS 36.133 [16]. E.g. RSRP and RSRQ results are available only if the UE has a
         sufficient number of results/ receives a sufficient number of subframes during the logging
         interval.
    3> else:
         4> if the UE is in any cell-selection state (as specified in TS 36.304 [4]):
              5> set anyCellSelectionDetected to indicate the detection of no suitable or no acceptable
                   cell found;
              5> if the RPLMN at the time of entering the any cell-selection state is included in
                   plmn-IdentityList stored in VarLogMeasReport; and,
              5> if the last serving cell while in camped normally state is part of the area indicated
                   by areaConfiguration if configured in VarLogMeasConfig:
                   6> set the servCellIdentity to indicate global cell identity of the last logged cell that the
                        UE was camping on;
                   6> set the measResultServCell to include the quantities of the last logged cell the UE
                        was camping on;
         4> else:
              5> set the servCellIdentity to indicate global cell identity of the cell the UE is camping on;
              5> set the measResultServCell to include the quantities of the cell the UE is camping on;
         4> if available, set the measResultNeighCells, in order of decreasing ranking-criterion as used
              for cell re-selection, to include neighbouring cell measurements that became available
              during the last logging interval for at most the following number of neighbouring cells: 6
              intra-frequency and 3 inter-frequency neighbours per frequency as well as 3 inter-RAT
              neighbours, per frequency/ set of frequencies (GERAN) per RAT and according to the
              following:
              5> for each neighbour cell included, include the optional fields that are available;
         4> for the cells included according to the previous (i.e. covering previous and current serving
              cells as well as neighbouring EUTRA cells) include results according to the extended
              RSRQ if corresponding results are available according to the associated performance
              requirements defined in TS 36.133 [16];
         4> for the cells included according to the previous (i.e. covering previous and current serving
              cells as well as neighbouring EUTRA cells) include RSRQ type if the result was based on
              measurements using a wider band or using all OFDM symbols;
NOTE 3: The UE includes the latest results of the available measurements as used for cell reselection
         evaluation in RRC_IDLE or as used for evaluation of reporting criteria or for measurement
         reporting according to 5.5.3 in RRC_CONNECTED, which are performed in accordance with
         the performance requirements as specified in TS 36.133 [16].
    2> when the memory reserved for the logged measurement information becomes full, stop timer T330
         and perform the same actions as performed upon expiry of T330, as specified in 5.6.6.4;
```

---

Figure 5A:
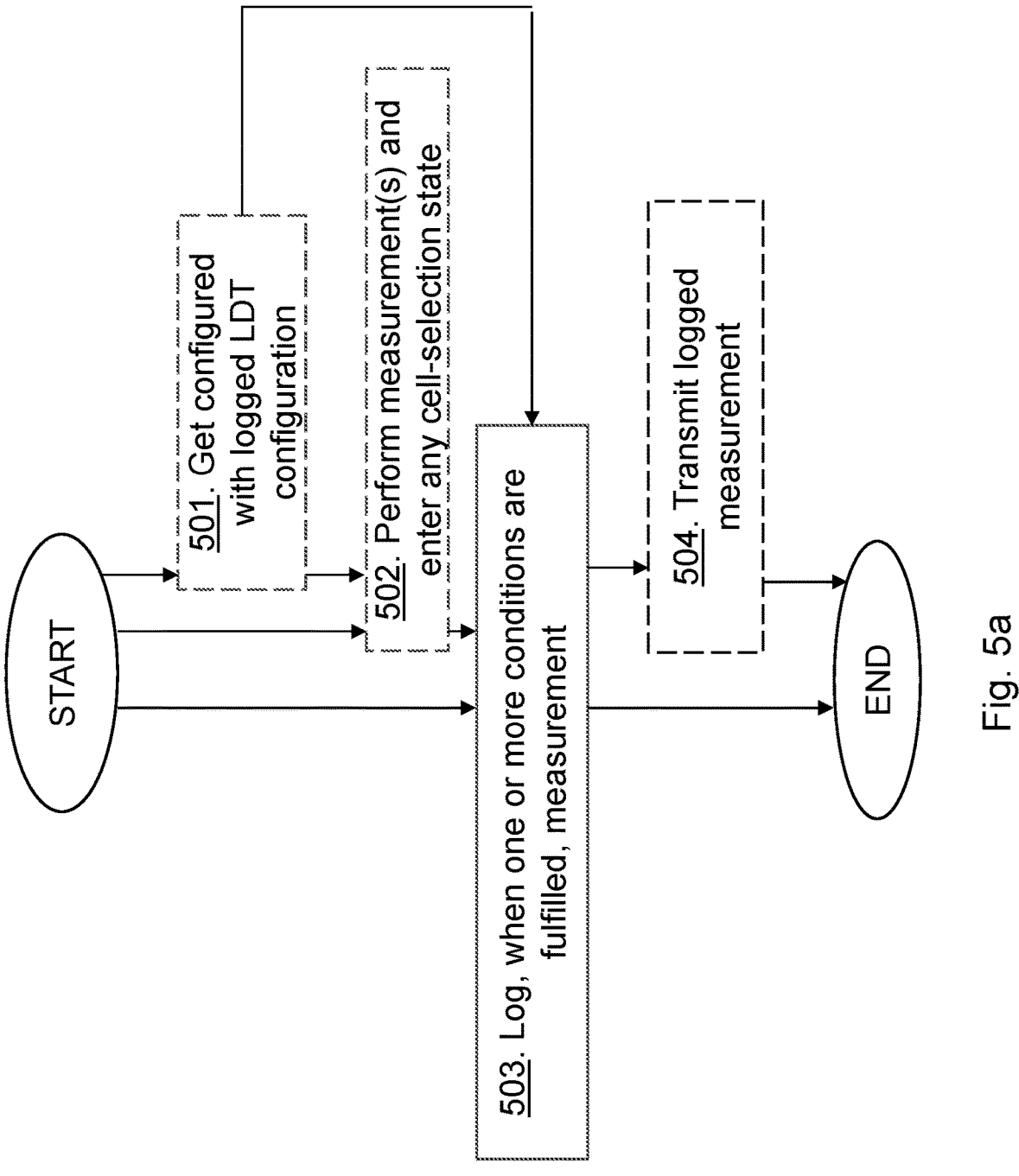
FIG. 5a shows a flowchart depicting a method performed by a UE according to embodiments herein.

The method actions performed by the UE 10 for handling measurements in the wireless communications network 1 according to embodiments herein will now be described with reference to a flowchart depicted in FIG. 5a. The actions do not have to be taken in the order stated below, but may be taken in any suitable order. Dashed boxes indicate optional features.

Action 501. The UE 10 may get configured with a logged MDT configuration having the list of PLMN identities. The UE 10 may further obtain a configuration or a policy regarding handling of MDT configurations at the UE. The configuration or the policy comprises the one or more conditions that indicate when to log a measurement such as an MDT measurement.

Action 502. The UE 10 may have an ongoing MDT configuration, e.g., may perform measurement or measurements in one or more cells and entering an any cell-selection state from camped state.

Action 503. As configured, the UE 10 logs, when one or more conditions are fulfilled, a measurement associated to a last serving cell after entering an any cell-selection state, wherein the one or more conditions comprise: the last serving cell, for example, at the time of entering the any cell-selection state, belongs to a PLMN, said PLMN is configured in the UE 10 in the list of PLMN identities in the logged MDT configuration. The one or more conditions may further comprise: the last serving cell belongs to an area configured in the UE 10 by RAN using areaConfiguration of the logged MDT configuration; thus, the last serving cell belongs to an area configured in the UE 10 by radio RAN in the areaConfiguration and belongs to certain PLMN as configured in the UE in the list of PLMN identities in the logged MDT configuration. The UE 10 may log the measurement, with the proviso that the one or more conditions are fulfilled, by setting a servCellIdentity to indicate global cell identity of the last serving cell that the UE 10 was camping on and/or setting a measResultServCell to include quantities of the last serving cell the UE 10 was camping on. Thus, the UE 10 may, when performing the logging: if the UE 10 is in any cell-selection state, and if the RPLMN at the time of entering the any cell-selection state is included in plmn-IdentityList stored in VarLogMeasReport: and if the last serving cell while in camped normally state is part of the area indicated by areaConfig of areaConfiguration if configured in VarLogMeasConfig:

set the servCellIdentity to indicate global cell identity of the last logged cell that the UE 10 was camping on;

set the measResultServingCell to include the quantities of the last logged cell the UE 10 was camping on.

Action 504. The UE 10 may then transmit the logged measurement to the radio network node 12 or any other radio network node when entering (upon camping on) the first cell of the radio network node 12. E.g., transmit a relativeTime-Stamp, locationInfo, serving cell identity of the last or first serving cell of the UE (servCellIdentity), the corresponding measurements of the last or first serving cell (measResultServingCell) and measurements of the neighboring cells (measResultNeighCell). The UE 10 doesn't need to return to the first cell. The UE 10 comes to RRC Connected state (not camped normally) in any cell (can be the first cell) where it is allowed to notify the network (PLMN and RAT may be matched). Then the UE 10 may notify the network regarding stored logged MDT report and sends to network only if network requests it to send.

Figure 5B:
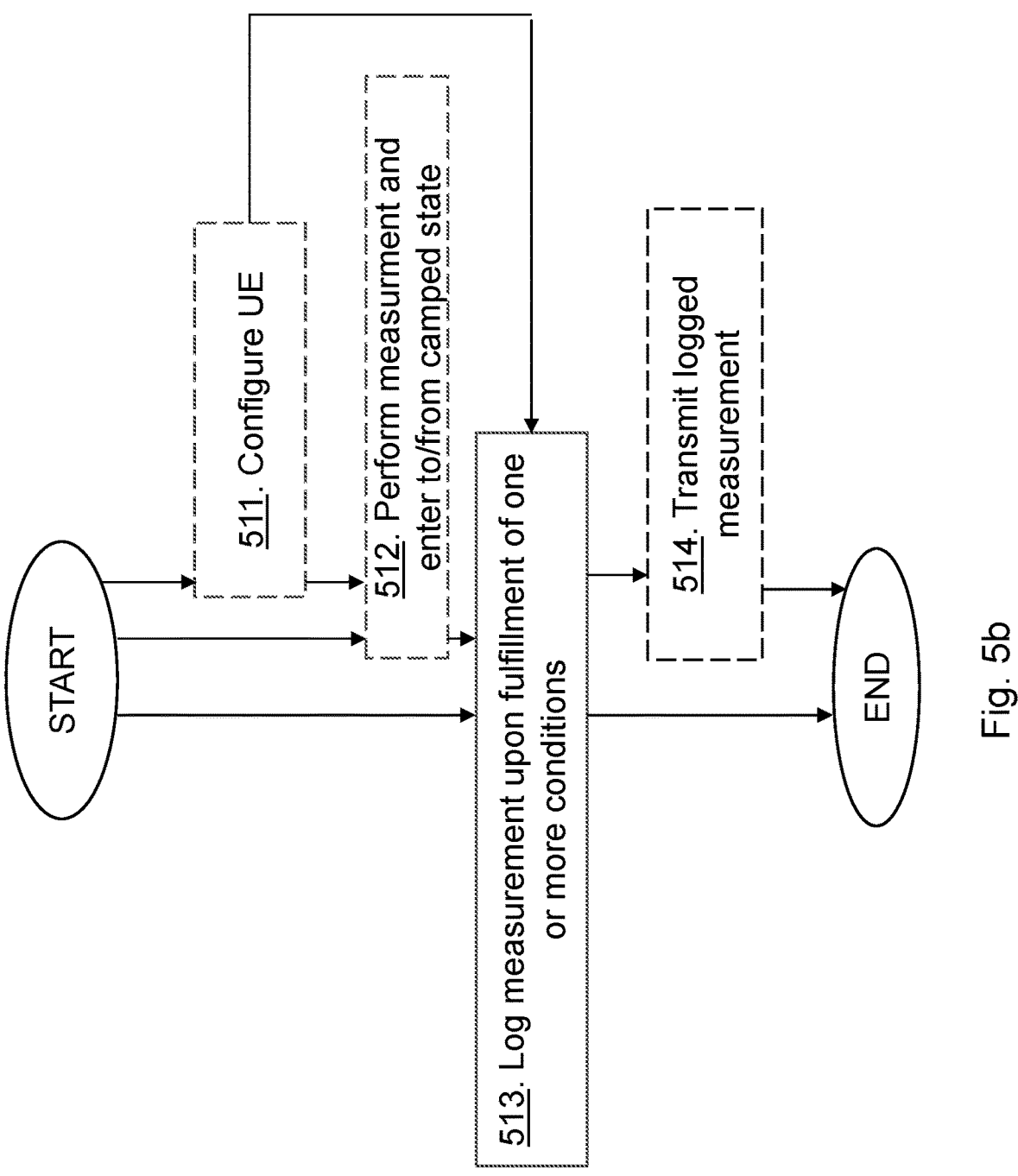
FIG. 5b shows a flowchart depicting a method performed by a UE according to embodiments herein.

The method actions performed by the UE 10 for handling communication in the wireless communications network 1 according to some embodiments herein will now be described with reference to a flowchart depicted in FIG. 5b. The actions do not have to be taken in the order stated below, but may be taken in any suitable order. Dashed boxes indicate optional features.

Action 511. The UE 10 may obtain a configuration or a policy regarding handling of MDT configurations at the UE 10. The configuration or the policy comprises one or more rules that indicate when to log a measurement such as an MDT measurement. Thus, the configuration may comprise one or more rules or conditions wherein one rule or condition may indicate to log MDT measurement only when PLMN of a last or first serving cell, entering or coming from an any cell-selection state, is in a PLMN list or the cell is of an area of the MDT configuration stored at the UE 10. Thus, the UE 10 may be configured to log a measurement associated to a last serving cell before entering an any cell-selection state and/or the first serving cell after coming back from the any cell-selection state only if one or more conditions are fulfilled.

Action 512. The UE 10 may have an ongoing MDT configuration, e.g., performing measurement or measurements in one or more cells and entering an any cell-selection state from camped state and/or going from any cell-selection state to a camped state also referred to as camped normally state. This is an IDLE state of the UE 10, where it is acting normally, i.e., may come to RRC connected state and originate, receive calls, texts etc.

Action 513. As configured, the UE 10 logs a measurement associated to a last serving cell, being the last serving cell before entering an any cell-selection state and/or the first serving cell after coming back from the any cell-selection state only if one or more conditions are fulfilled. For example, UE logs the measurement and the serving cell: if the last serving cell and/or the first serving cell belongs to a PLMN that is configured in a PLMN list such as an plmn-IdentityList of a logged MDT configuration; If the last serving cell and/or the first serving cell belongs to an area configured by RAN using areaConfiguration of the logged MDT configuration; and/or if the last serving cell and/or the first serving cell belongs to an area configured by RAN in areaConfiguration and belongs to a PLMN as configured in the plmn-identityList of the logged MDT configuration. With the proviso that one or more conditions are fulfilled the UE 10 may thus set the servCellIdentity to indicate global cell identity of the last logged cell that the UE 10 was camping on and/or set the measResultServCell to include the quantities of the last logged cell the UE 10 was camping on.

Action 514. The UE 10 may then transmit the logged measurement to the radio network node 12 or any other radio network node when entering (upon camping on) the first cell of the radio network node 12. E.g., the UE 10 may transmit a relativeTimeStamp, locationInfo, serving cell identity of the last or first serving cell of the UE (servCellIdentity), the corresponding measurements of the last or first serving cell (measResultServingCell) and measurements of the neighboring cells (measResultNeighCell). The UE 10 doesn't need to return to the first cell. The UE 10 comes to RRC Connected state, not camped normally, in any cell, can be the first cell, where it is allowed to notify the network, PLMN and RAT needs to be matched. Then it notifies the network regarding stored logged MDT report and sends to network only if network requests it to send.

Figure 6A:
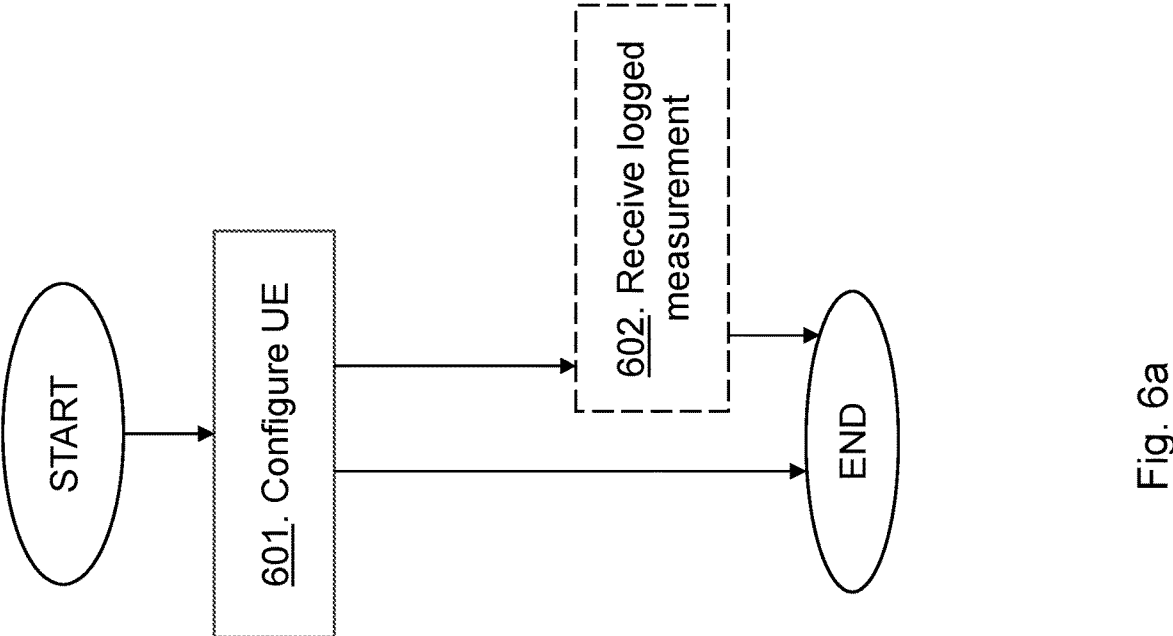
FIG. 6a shows a flowchart depicting a method performed by a radio network node according to embodiments herein.

The method actions performed by the radio network node 12 for handling communication in the wireless communications network 1 according to embodiments herein will now be described with reference to a flowchart depicted in FIG. 6a. The actions do not have to be taken in the order stated below, but may be taken in any suitable order. Dashed boxes indicate optional features.

Action 601. The radio network node 12 configures the UE 10 to log the measurement associated to the last serving cell after entering an any cell-selection state when one or more conditions are fulfilled, wherein the one or more conditions comprise: the last serving cell belongs to the PLMN, said PLMN is configured in the UE 10 in the list of PLMN identities in the logged MDT configuration. The one or more conditions may further comprise: the last serving cell belongs to an area configured in the UE 10 by RAN using areaConfiguration of the logged MDT configuration, thus, the last serving cell belongs to an area configured in the UE 10 by the RAN in the areaConfiguration and belongs to certain PLMN as configured in the UE 10 in the list of the logged MDT configuration. Thus, the radio network node 12 may configure the UE 10 with the configuration regarding handling of MDT configurations at the UE. The configuration comprises one or more conditions that indicate when to log a measurement such as an MDT measurement. Thus, the configuration may comprise the one or more conditions wherein one condition may indicate to log an MDT measurement when PLMN of the last serving cell, for example, at the time of entering the any cell-selection state, is in a PLMN list and/or the cell is of an area of the MDT configuration stored at the UE 10. Thus, the UE 10 may be configured to log the measurement associated to the last serving cell after entering the any cell-selection state when the one or more conditions are fulfilled.

Action 602. The radio network node 12 may then receive from the UE 10 the logged measurement, or from any other radio network node, when the UE 10 enters the first cell of the radio network node 12.

Figure 6B:
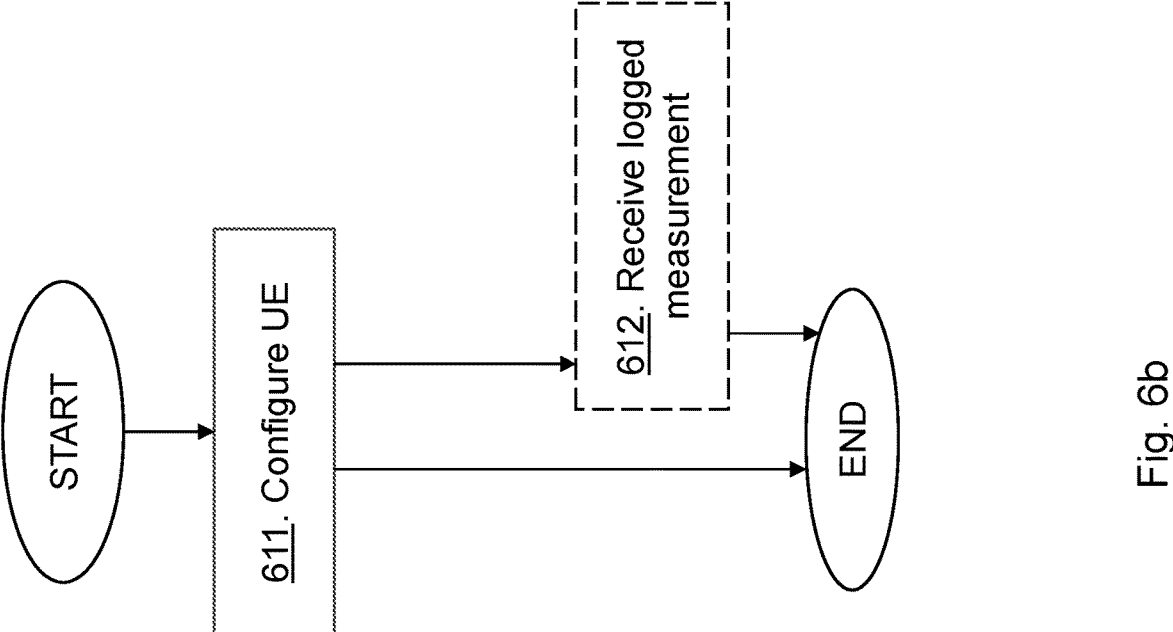
FIG. 6b shows a flowchart depicting a method performed by a radio network node according to embodiments herein.

The method actions performed by the radio network node 12 for handling communication in the wireless communications network 1 according to some embodiments herein will now be described with reference to a flowchart depicted in FIG. 6b. The actions do not have to be taken in the order stated below, but may be taken in any suitable order. Dashed boxes indicate optional features.

Action 611. The radio network node 12 may configure the UE 10 with the configuration or the policy regarding handling of MDT configurations at the UE 10. The configuration or the policy comprises one or more conditions that indicate when to log a measurement such as an MDT measurement. Thus, the configuration may comprise one or more conditions wherein one condition may indicate to log MDT measurement when PLMN of a last or first serving cell, entering or coming from an any cell-selection state, is in a PLMN list or the cell is of an area of the MDT configuration stored at the UE 10. Thus, the UE 10 may be configured to log a measurement associated to a last serving cell, being the last serving cell before entering an any cell-selection state and/or the first serving cell after coming back from the any cell-selection state only if one or more conditions are fulfilled.

Action 612. The radio network node 12 may then receive from the UE 10 a logged measurement, e.g., an MDT measurement.

Figure 7:
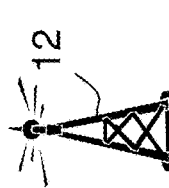
FIG. 7 shows a block diagram depicting embodiments of a UE according to embodiments herein.
Figure 7:
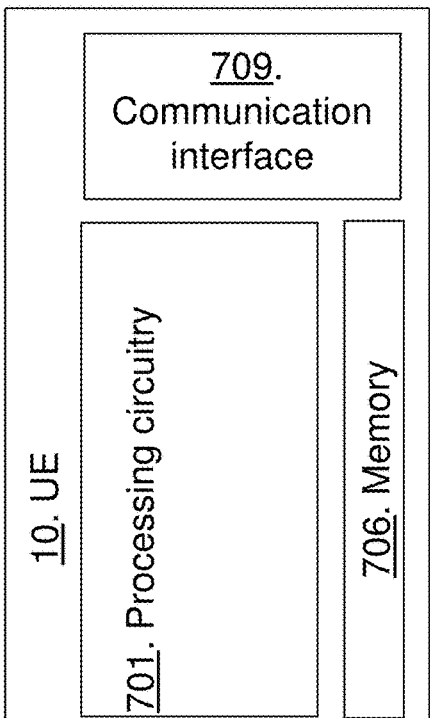
Figure 7:
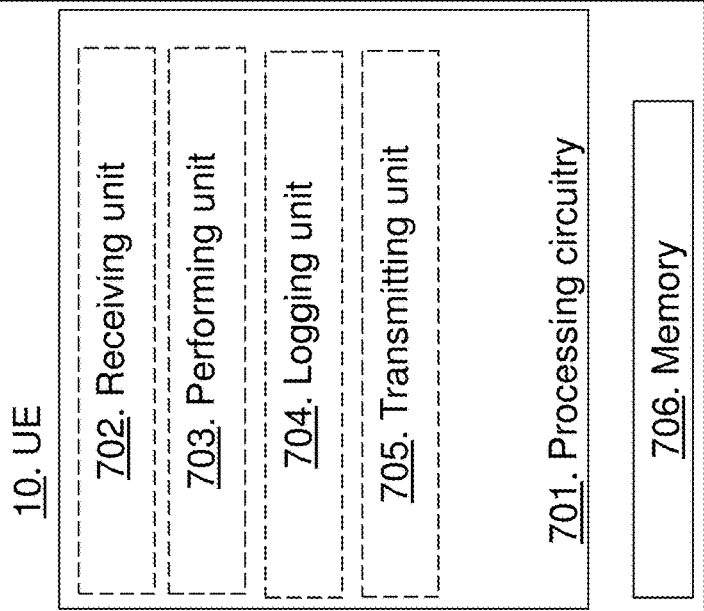
Figure 7:
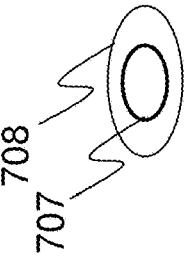

FIG. 7 is a block diagram depicting the UE 10 for handling communication in the wireless communications network 1 according to embodiments herein.

The UE 10 may comprise processing circuitry 701, e.g., one or more processors, configured to perform the methods herein.

The UE 10 may comprise a receiving unit 702, e.g., a receiver or a transceiver. The UE 10, the processing circuitry 701 and/or the receiving unit 702 may be configured to obtain the configuration or the policy regarding handling of MDT configurations at the UE. The configuration or the policy comprises one or more rules that indicate when to log a measurement such as an MDT measurement. Thus, the configuration may comprise one or more rules wherein one rule may indicate to log MDT measurement when PLMN of a last serving cell is in a PLMN list stored at the UE 10. Thus, the UE 10 may be configured to log a measurement associated to the last serving cell after entering the any cell-selection state and/or the first serving cell after coming back from the any cell-selection state only if one or more conditions are fulfilled.

The UE 10 may comprise a performing unit 703, e.g., a measuring unit. The UE 10, the processing circuitry 701 and/or the performing unit 703 may be configured to perform one or more measurements in cells and entering an any cell-selection state from camped state. The UE 10 may further go from the any cell-selection state to a camped state.

The UE 10 may comprise a logging unit 704. The UE 10, the processing circuitry 701 and/or the logging unit 704 is configured to log, when the one or more conditions are fulfilled, the measurement associated to the last serving cell after entering the any cell-selection state. The one or more conditions comprise: the last serving cell belongs to the PLMN, said PLMN is configured in the UE 10 in the list of PLMN identities in the logged MDT configuration. The one or more conditions may further comprise: the last serving cell belongs to the area configured in the UE 10 by the RAN using areaConfiguration of the logged MDT configuration. Thus, the UE 10, the processing circuitry 701 and/or the logging unit 704 may be configured to log the measurement associated to the last serving cell, being the last serving cell before entering the any cell-selection state and/or the first serving cell after coming back from the any cell-selection state only if the one or more conditions are fulfilled. For example, the UE 10, the processing circuitry 701 and/or the logging unit 704 may be configured to log the measurement and the serving cell: if the last serving cell and/or the first serving cell belongs to a PLMN that is configured in the PLMN list such as an plmn-IdentityList of a logged MDT configuration; If the last serving cell and/or the first serving cell belongs to the area configured by RAN using areaConfiguration of the logged MDT configuration; and/or if the last serving cell and/or the first serving cell belongs to the area configured by RAN in areaConfiguration and belongs to a PLMN as configured in the plmn-identityList of the logged MDT configuration. With the proviso that one or more conditions are fulfilled the UE 10, the processing circuitry 701 and/or the logging unit 704 may be configured set the servCellIdentity to indicate global cell identity of the last logged cell that the UE was camping on and/or set the measResultServCell to include the quantities of the last logged cell the UE 10 was camping on. Thus, the UE 10, the processing circuitry 701 and/or the logging unit 704 may be configured to log the measurement, with the proviso that the one or more conditions are fulfilled, by setting a servCellIdentity to indicate global cell identity of the last serving cell that the UE 10 was camping on and/or setting a measResultServCell to include quantities of the last serving cell the UE 10 was camping on.

The UE 10 may comprise a transmitting unit 705, e.g., a transmitter or a transceiver. The UE 10, the processing circuitry 701 and/or the transmitting unit 705 may further be configured to transmit the logged measurement to the radio network node 12 or another radio network node when entering (upon camping on) the first cell of the radio network node 12 or any other radio network node. E.g., transmit a relativeTimeStamp, locationInfo, serving cell identity of the last or first serving cell of the UE 10 (servCellIdentity), the corresponding measurements of the last or first serving cell (measResultServingCell) and measurements of the neighboring cells (measResultNeighCell).

The UE 10 may comprise a memory 706. The memory 706 comprises one or more units to be used to store data on, such as data packets, one or more conditions, mobility events, measurements, events and applications to perform the methods disclosed herein when being executed, and similar. Furthermore, the UE 10 may comprise a communication interface 709 such as comprising a transmitter, a receiver, a transceiver and/or one or more antennas.

The methods according to the embodiments described herein for the UE 10 are respectively implemented by means of, e.g., a computer program product 707 or a computer program, comprising instructions, i.e., software code portions, which, when executed on at least one processor, cause the at least one processor to carry out the actions described herein, as performed by the UE 10. The computer program product 707 may be stored on a computer-readable storage medium 708, e.g., a disc, a universal serial bus (USB) stick or similar. The computer-readable storage medium 708, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 8:
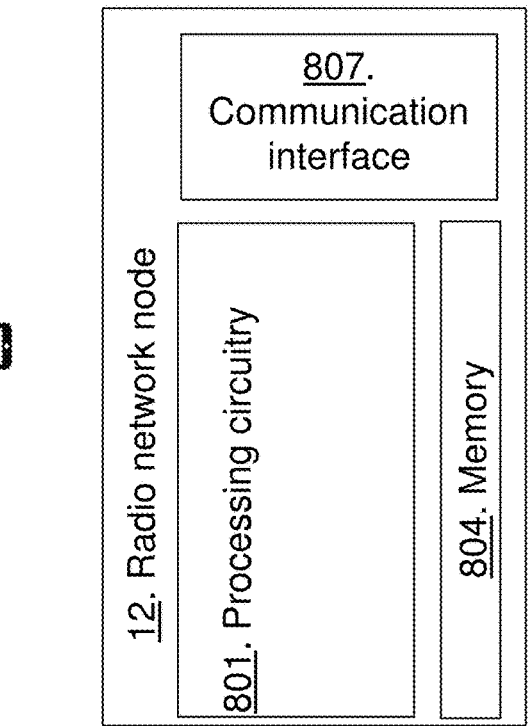
FIG. 8 shows a block diagram depicting embodiments of a radio network node according to embodiments herein.
Figure 8:
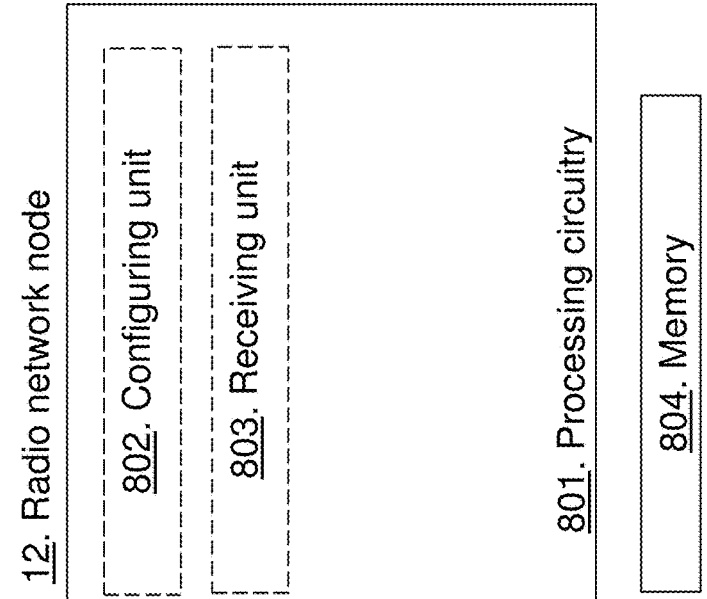
Figure 8:
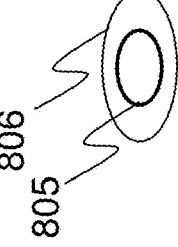

FIG. 8 is a block diagram depicting the radio network node 12 for handling communication in the wireless communications network 1 according to embodiments herein.

The radio network node 12 may comprise processing circuitry 801, e.g., one or more processors, configured to perform the methods herein.

The radio network node 12 may comprise a configuring unit 802, e.g., a transmitter or a transceiver. The radio network node 12, the processing circuitry 801 and/or the configuring unit 802 is configured to configure the UE 10 to log the measurement associated to the last serving cell after entering the any cell-selection state when one or more conditions are fulfilled, wherein the one or more conditions comprise: the last serving cell belongs to a PLMN, said PLMN is configured in the UE 10 in the list of PLMN identities in the logged MDT configuration. The one or more conditions may further comprise: the last serving cell belongs to the area configured in the UE 10 by RAN using areaConfiguration of the logged MDT configuration. Thus, the radio network node 12, the processing circuitry 801 and/or the configuring unit 802 may be configured to configure the UE 10 with the configuration or the policy regarding handling of MDT configurations at the UE 10. The configuration or the policy may comprise the one or more rules that indicate when to log a measurement such as an MDT measurement. Thus, the configuration may comprise one or more rules wherein one rule may indicate to log MDT measurement when PLMN of a last serving cell or a first serving cell is in the PLMN list or a RAN area stored at the UE 10. The one or more rules/conditions may define to only log the measurement and the serving cell: if the last serving cell and/or the first serving cell belongs to a PLMN that is configured in the PLMN list such as an plmn-IdentityList of the logged MDT configuration; If the last serving cell and/or the first serving cell belongs to the area configured by RAN using areaConfiguration of the logged MDT configuration; and/or if the last serving cell and/or the first serving cell belongs to the area configured by RAN in areaConfiguration and belongs to a PLMN as configured in the plmn-identityList of the logged MDT configuration.

The radio network node 12 may comprise a receiving unit 803, e.g., receiver or transceiver. The radio network node 12, the processing circuitry 801 and/or the receiving unit 803 may be configured receive from the UE 10, the logged measurement, or from any other radio network node, when the UE 10 enters the first cell of the radio network node 12. The radio network node 12, the processing circuitry 801 and/or the receiving unit 803 may be configured receive from the UE 10 a logged measurement, e.g., an MDT measurement.

The radio network node 12 may comprise a memory 804. The memory 804 comprises one or more units to be used to store data on, such as data packets, mobility events, configurations, logged measurements, MDT configurations, events and applications to perform the methods disclosed herein when being executed, and similar. Furthermore, the radio network node 12 may comprise a communication interface 807 such as comprising a transmitter, a receiver, a transceiver and/or one or more antennas.

The methods according to the embodiments described herein for the radio network node 12 are respectively implemented by means of, e.g., a computer program product 805 or a computer program, comprising instructions, i.e., software code portions, which, when executed on at least one processor, cause the at least one processor to carry out the actions described herein, as performed by the radio network node 12. The computer program product 805 may be stored on a computer-readable storage medium 806, e.g. a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

In some embodiments a more general term "radio network node" is used and it can correspond to any type of radio-network node or any network node, which communicates with a wireless device and/or with another network node.

Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. NR, Wi-Fi, LTE, LTE-Advanced, WCDMA, Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| 5GC | 5th Generation Core Network |
| AS | Application Server |
| CA | Carrier Aggregation |
| CN | Core Network |
| EUTRA | Evolved Universal Terrestrial Radio Access |
| ID | Identity/Identifier |
| LBT | Listen Before Talk |
| LTE | Long Term Evolution |
| MAC | Medium Access Control |
| MCG | Master Cell Group |
| MDT | Minimization of Drive Tests |
| MN | Master Node |
| NR | New Radio |
| RAN | Radio Access Network |
| RAT | Radio Access Technology |
| RLC | Radio Link Control |
| RLF | Radio Link Failure |
| RRC | Radio Resource Control |
| SN | Secondary Node |
| UE | User Equipment |

The invention claimed is:

1. A method performed by a user equipment (UE) for handling one or more measurements in a wireless communications network, the method comprising:

logging, when a plurality of conditions are fulfilled, a measurement associated to a last serving cell after entering an any cell-selection state;

wherein the plurality of conditions comprises:

the last serving cell belonging to a public land mobile network (PLMN) that is configured in the UE in a list of PLMN identities in a logged minimization of drive test (MDT) configuration;

a reportType included in the logged MDT configuration being set to eventTriggered; and an eventType included in the logged MDT configuration being set to outOfCoverage.

2. The method of claim 1, wherein the plurality of conditions further comprises the last serving cell belonging to an area configured in the UE by a radio access network (RAN) using an areaConfiguration of the logged MDT configuration.

3. The method of claim 1, wherein logging the measurement comprises setting a servCellIdentity to indicate global cell identity of the last serving cell that the UE was camping on and/or setting a measResultServCell to include quantities of the last serving cell the UE was camping on.

4. The method of claim 1, further comprising transmitting the logged measurement to a radio network node or any other radio network node when entering a first cell of the radio network node.

5. A method performed by a radio network node for handling communication in a wireless communications network, the method comprising:

configuring a user equipment (UE) to log a measurement associated to a last serving cell after entering an any cell-selection state when a plurality of conditions are fulfilled;

wherein the plurality of conditions comprises:

the last serving cell belonging to a public land mobile network (PLMN) that is configured in the UE in a list of PLMN identities in a logged minimization of drive test (MDT) configuration;

a reportType included in the logged MDT configuration being set to eventTriggered; and an eventType included in the logged MDT configuration being set to outOfCoverage.

6. The method of claim 5, wherein the plurality of conditions further comprises the last serving cell belonging to an area configured in the UE by a radio access network (RAN) using an areaConfiguration of the logged MDT configuration.

7. The method of claim 5, further comprising receiving the logged measurement from the UE or any other radio network node when the UE enters a first cell of the radio network node.

8. A user equipment (UE) for handling one or more measurements in a wireless communications network, the UE comprising:

processing circuitry and memory, the memory containing instructions executable by the processing circuitry whereby the UE is configured to:

log, when a plurality of conditions are fulfilled, a measurement associated to a last serving cell after entering an any cell-selection state;

wherein the plurality of conditions comprises:

the last serving cell belonging to a public land mobile network (PLMN) that is configured in the UE in a list of PLMN identities in a logged minimization of drive test (MDT) configuration;

a reportType included in the logged MDT configuration being set to eventTriggered; and an eventType included in the logged MDT configuration being set to outOfCoverage.

9. The UE of claim 8, wherein the plurality of conditions further comprises the last serving cell belonging to an area configured in the UE by a radio access network (RAN) using an areaConfiguration of the logged MDT configuration.

10. The UE of claim 8, wherein the UE is configured to log the measurement by setting a servCellIdentity to indicate global cell identity of the last serving cell that the UE was camping on and/or setting a measResultServCell to include quantities of the last serving cell the UE was camping on.

11. The UE of claim 8, wherein the UE is further configured to transmit the logged measurement to a radio network node or any other radio network node when entering a first cell of the radio network node.

12. A radio network node for handling communication in a wireless communications network, the radio network node comprising:

processing circuitry and memory, the memory containing instructions executable by the processing circuitry whereby the radio network node is configured to:

configure a user equipment (UE) to log a measurement associated to a last serving cell after entering an any cell-selection state when a plurality of conditions are fulfilled;

wherein the plurality of conditions comprises:

the last serving cell belonging to a public land mobile network (PLMN) that is configured in the UE in a list of PLMN identities in a logged minimization of drive test (MDT) configuration;

a reportType included in the logged MDT configuration being set to eventTriggered; and an eventType included in the logged MDT configuration being set to outOfCoverage.

13. The radio network node of claim 12, wherein the plurality of conditions further comprises the last serving cell belonging to an area configured in the UE by a radio access network (RAN) using an areaConfiguration of the logged MDT configuration.

14. The radio network node of claim 12, wherein the radio network node is further configured to receive the logged measurement from the UE or any other radio network node when the UE enters a first cell of the radio network node.

\* \* \* \* \*